United States Patent
Wang et al.

(10) Patent No.: US 12,290,921 B2
(45) Date of Patent: May 6, 2025

(54) METHOD AND APPARATUS FOR CONTROLLING WHEEL-LEGGED ROBOT, WHEEL-LEGGED ROBOT, AND DEVICE

(71) Applicant: TENCENT TECHNOLOGY (SHENZHEN) COMPANY LIMITED, Guangdong (CN)

(72) Inventors: Shuai Wang, Shenzhen (CN); Haitao Wang, Shenzhen (CN); Xinyang Jiang, Shenzhen (CN); Jiafeng Xu, Shenzhen (CN); Dongsheng Zhang, Shenzhen (CN); Ke Chen, Shenzhen (CN); Jingfan Zhang, Shenzhen (CN); Jie Lai, Shenzhen (CN); Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 17/991,585

(22) Filed: Nov. 21, 2022

(65) Prior Publication Data

US 2023/0087057 A1    Mar. 23, 2023

Related U.S. Application Data

(63) Continuation of application No. PCT/CN2022/088204, filed on Apr. 21, 2022.

(30) Foreign Application Priority Data

May 31, 2021   (CN) .......................... 202110604984.4

(51) Int. Cl.
   *B25J 5/00*     (2006.01)
   *B25J 9/16*     (2006.01)
   *B25J 13/08*    (2006.01)

(52) U.S. Cl.
   CPC ............ *B25J 5/007* (2013.01); *B25J 9/1615* (2013.01); *B25J 9/163* (2013.01); *B25J 9/1648* (2013.01);
   (Continued)

(58) Field of Classification Search
   CPC ...... B25J 13/085; B25J 13/088; B25J 9/1602; B25J 9/1633; B25J 9/1664; B25J 9/1615;
   (Continued)

(56) References Cited

U.S. PATENT DOCUMENTS 9,020,639 B2 *   4/2015   Bewley .................... B25J 5/005
                                                                 700/250
2008/0230285 A1   9/2008   Bewley et al.
(Continued)

FOREIGN PATENT DOCUMENTS

CN   110315543 A   10/2019
CN   110405762 A   11/2019
(Continued)

OTHER PUBLICATIONS

International Search Report of PCT/CN2022/088204 dated Jul. 19, 2022 [PCT/ISA/210].
(Continued)

*Primary Examiner* — Dalena Tran
(74) *Attorney, Agent, or Firm* — Sughrue Mion, PLLC

(57) ABSTRACT

A method includes: obtaining current motion state data of the wheel-legged robot, the current motion state data representing motion features of the wheel-legged robot, inputting the current motion state data into a nonlinear controller to obtain a target joint angular acceleration reference value of a target robot joint of the wheel-legged robot, and inputting the target joint angular acceleration reference
(Continued)

value into a whole-body dynamics controller to output a joint torque for controlling the wheel-legged robot to perform a control task.

20 Claims, 7 Drawing Sheets

(52) U.S. Cl.
CPC ........... *B25J 9/1653* (2013.01); *B25J 9/1664* (2013.01); *B25J 13/088* (2013.01)

(58) Field of Classification Search
CPC ........ B25J 9/1648; B25J 9/1653; B25J 9/163; B25J 5/007
See application file for complete search history.

(56) References Cited

U.S. PATENT DOCUMENTS

| 2010/0057252 | A1* | 3/2010 | Kim | ................... | G05B 19/4067 |
| | | | | | 700/245 |
| 2011/0231050 | A1* | 9/2011 | Goulding | ............. | G05D 1/0891 |
| | | | | | 180/8.1 |
| 2017/0255719 | A1* | 9/2017 | Kelly | ..................... | G06F 30/20 |
| 2019/0291277 | A1* | 9/2019 | Oleynik | ................. | B25J 9/1669 |
| 2020/0216127 | A1 | 7/2020 | Suh et al. | | |
| 2020/0306998 | A1 | 10/2020 | Talebi et al. | | |

FOREIGN PATENT DOCUMENTS

| CN | 110764413 | A | 2/2020 |
| CN | 111208826 | A | 5/2020 |
| CN | 111290272 | A | 6/2020 |
| CN | 111547177 | A | 8/2020 |
| CN | 113753150 | A | 12/2021 |
| WO | 2020/036111 | A1 | 2/2020 |

OTHER PUBLICATIONS

Written Opinion of PCT/CN2022/088204 dated Jul. 19, 2022 [PCT/ISA/237].

Zhang, et al., "System Design and Balance Control of a Bipedal Leg-wheeled Robot", Proceedings of the IEEE International Conference on Robotics and Biomimetics, Dali, China, Dec. 2019, pp. 1869-1874.

Raza, et al., "Balance Stability Augmentation for Wheel-Legged Biped Robot Through Arm Acceleration Control", IEEE Access, Apr. 5, 2021, vol. 9, p. 54022-54031.

* cited by examiner

US 12,290,921 B2

METHOD AND APPARATUS FOR CONTROLLING WHEEL-LEGGED ROBOT, WHEEL-LEGGED ROBOT, AND DEVICE

CROSS-REFERENCE TO RELATED APPLICATIONS

This application is a continuation application of International Application No. PCT/CN2022/088204, filed on Apr. 21, 2022, which claims priority to Chinese Patent Application No. 202110604984.4, filed with the China National Intellectual Property Administration on May 31, 2021, the disclosures of each of which being incorporated by reference herein in their entireties.

FIELD

This disclosure relates to the field of robot control, and particularly to a method and apparatus for controlling a wheel-legged robot, a wheel-legged robot, and a device.

BACKGROUND

A wheel-legged robot is a robot structure that controls the motion of a robot body by a wheel leg structure. Since wheel-legged robots are an unstable underactuated systems, there is a problem of balance control. In related technologies, task performing processes of the wheel-legged robot are controlled by a whole-body dynamics controller.

However, in related technologies, the wheel-legged robot may be controlled to only complete simple actions. In a case of relatively complex target actions, such as jump, somersault and step walking, the distance of the wheel-legged robot away from a balance point is larger, and once the distance exceeds a controllable range of linearization, the balance control of the wheel-legged robot may not be achieved. How to achieve stable and flexible control of complex action task performing processes of the wheel-legged robot is a problem to be solved.

SUMMARY

According to various embodiments, a method for controlling a wheel-legged robot, performed by at least one processor, may include obtaining current motion state data of the wheel-legged robot, the current motion state data representing motion features of the wheel-legged robot; inputting the current motion state data into a nonlinear controller to obtain a target joint angular acceleration reference value of a target robot joint of the wheel-legged robot; and inputting the target joint angular acceleration reference value into a whole-body dynamics controller to output a joint torque for controlling the wheel-legged robot to perform a control task.

According to various embodiments, an apparatus for controlling a wheel-legged robot, a wheel-legged robot, a computer device, a non-transitory computer-readable storage medium, a chip, and a computer program product consistent with the foregoing method may also be provided.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
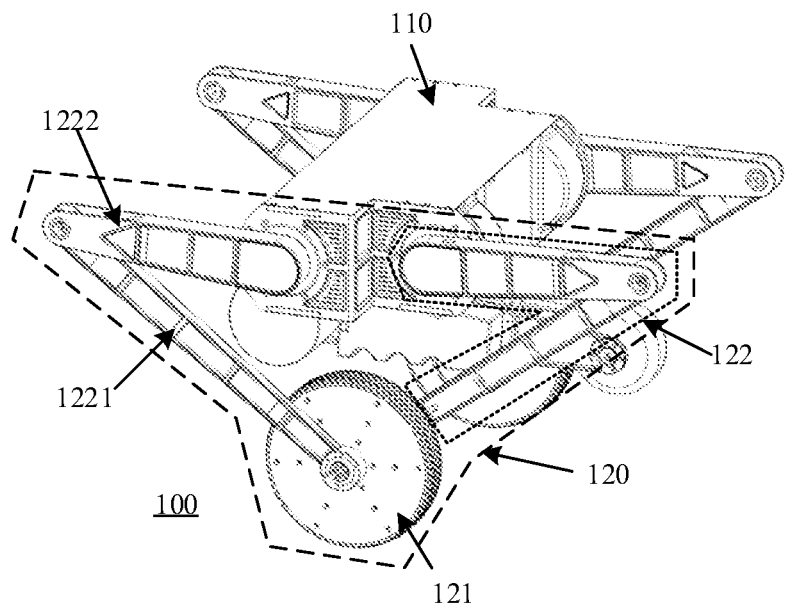
FIG. 1 is a schematic structural diagram of a wheel-legged robot according to some embodiments.

By using the target joint angular acceleration reference value of the target robot joint of the wheel-legged robot, determined by the nonlinear controller, as the input of the whole-body dynamics controller, combining the advantages of a nonlinear system control method for stable control of the robot and a whole-body dynamics method for flexible control of the robot, and considering the accuracy of balance control of the robot and the flexibility of flexible control of the robot, The control stability and accuracy of the wheel-legged robot may be improved and the wheel-legged robot may be controlled to flexibly complete complex actions such as jumping, somersaults and step walking.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

First, terms involved in in some embodiments are introduced as follows:

Wheel-legged robot: A wheel-legged robot is a robot structure that controls the motion of a base of the robot by wheel leg structures. Since contact points between the wheel-legged robot and the ground only include contact points between wheels and the ground, there is a problem of balance control in a case that the arrangement of the wheel leg structures is unstable. The wheel leg structure means that the upper part is a leg structure with joints, and the lower part is a driving structure of a wheel structure.

The wheel-legged robot may be understood as any robot with a wheel structure. The specific structure of the wheel-legged robot may be set according to actual needs. In some embodiments, the wheel-legged robot may be implemented as a wheel-legged biped robot, the wheel leg of the wheel-legged biped robot includes two wheels for moving, and the two wheels are respectively connected with leg structures of the wheel-legged biped robot, and are connected with the base of the robot through the leg structures, so that the two wheels drive the base to complete motion control.

In some embodiments, the wheel-legged biped robot includes four leg structures, every two leg structures are connected with a wheel, and each leg structure may be formed by connecting a shank segment and a thigh segment through a rotation joint. For example, the wheel-legged biped robot includes a leg structure A, a leg structure B, a leg structure C and a leg structure D, the leg structure A and the leg structure B are connected with the first wheel (regarded as the left wheel), and the leg structure C and the leg structure D are connected with the second wheel (regarded as the right wheel). The leg structure A, the leg structure B and the first wheel as well as the leg structure C, the leg structure D and the second wheel constitute a two-leg plane parallel structure of the wheel-legged robot. Each parallel structure has five rotation joints with two translational degrees of freedom in a horizontal direction and a vertical direction respectively.

Controller: It is a method preset in in some embodiments for balance control of the wheel-legged robot, and is generally expressed by a mathematical formula and achieved by code programming. In some embodiments, in a case that the wheel-legged robot deviates from a balance point and a linear model may not be used for balance control, the controller is configured to perform balance control of the wheel-legged robot with reference to a linear control mode and a nonlinear control mode. Furthermore, motion control and flexible control may further be performed on the wheel-legged robot.

The wheel-legged robot includes a wheel leg and a base connected to the wheel leg, and each of the wheel leg and the base includes at least one joint.

The wheel leg refers to a wheel component used by the wheel-legged robot to achieve motion. The wheel leg may be of a wheel leg configuration with a single wheel, two wheels, four wheels or other number of wheels, and each wheel leg may be controlled by two legs in parallel or multiple legs in series. It is to be understood that the specific composition type and the number of wheels of the wheel leg are not limited herein.

The base refers to a main part of the wheel-legged robot, such as a trunk of the wheel-legged robot, the base may be a flat plate component connected to the wheel leg of the wheel-legged robot, or the base may have other forms according to actual needs. The specific shape and compositions of the base are not limited herein.

The base may be connected to the wheel leg through a bracket, or the connection between the base and the wheel leg may be achieved in other modes. The specific connection mode of the base and the wheel leg is not limited herein.

In some embodiments, the base may include six joints (three-dimensional coordinate position and three-dimensional Euler angle), and the wheel leg may include two joints; or the base may include one joint, and the wheel leg may include eight joints. The specific number of joints included in the base and the wheel leg and the specific joint configuration of the wheel-legged robot are not limited herein.

FIG. 1 is a schematic structural diagram of a wheel-legged robot 100 according to some embodiments. As shown in FIG. 1, the wheel-legged robot 100 may be a wheel-legged biped robot. The wheel-legged robot 100 includes a base 110 and a wheel leg 120.

The base 110 is connected with the wheel leg 120. The wheel leg 120 includes two wheels 121 and leg structures 122 for connecting the wheels 121 and the base 110. As shown in FIG. 1, the wheel-legged robot 100 includes four leg structures 122, and two of the four leg structures 122 are respectively connected with one wheel 121. In some embodiments, a leg structure A, a leg structure B, a leg structure C and a leg structure D are included, the leg structure A and the leg structure B are connected with the first wheel, and the leg structure C and the leg structure D are connected with the second wheel. The leg structure A, the leg structure B and the first wheel as well as the leg structure C, the leg structure D and the second wheel constitute a two-leg plane parallel structure of the wheel-legged robot 100. The parallel leg has five rotation joints with two translational degrees of freedom in a horizontal direction and a vertical direction respectively. Compared with a serial mechanism, the parallel mechanism has the characteristics of compact structure, high stiffness and strong bearing capacity. Therefore, the robot may jump higher and avoid obstacles flexibly.

In some embodiments, the leg structure 122 includes a shank segment 1221 and a thigh segment 1222, the shank segment 1221 and the thigh segment 1222 are connected by a rotation joint, and the shank segment 1221 and the wheel 121 are also connected by a rotation joint.

Four sets of motors corresponding to the four leg structures 122 respectively are arranged in the base 110, and the four sets of motors are configured to control the bending and straightening of the leg structures 122. In some embodiments, a segment of the leg structure 122 connected with the base 110 is connected by a rotation joint. In some embodiments, as shown in FIG. 1, when the motor drives the rotation joint to rotate clockwise, the leg structure 122 is controlled to bend; and when the motor drives the rotation joint to rotate counterclockwise, the leg structure 122 is controlled to straighten. (Modes of driving two sets of leg structures 122 by rotation joints are the same or different). That is, the relationships between the clockwise and counterclockwise rotation modes and the bending and straightening control modes are the same or different.

Figure 2:
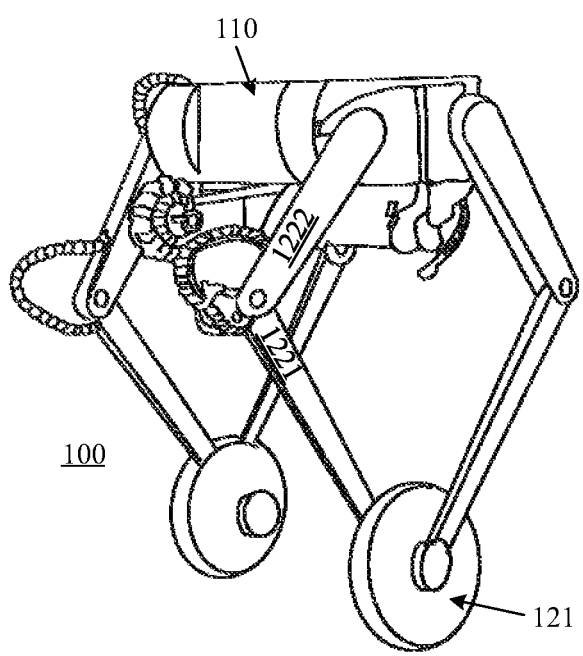
FIG. 2 is a schematic diagram of representation of a wheel-legged robot at different heights according to some embodiments.

The bending or straightening of the leg structure 122 (that is, the relative position relationship between the shank segment 1221 and the thigh segment 1222) is used for controlling the height of the wheel-legged robot 100. That is, when the leg structure 122 tends to bend, the height of the wheel-legged robot 100 decreases; and when the leg structure 122 tends to straighten, the height of the wheel-legged robot 100 increases. In some embodiments, referring to FIG. 2, the bending degree of the leg structure 122 shown in FIG. 1 is larger, and in this case, the wheel-legged robot 100 is lower. The bending degree of the leg structure 122 in FIG. 2 is smaller than that of the leg structure 122 in FIG. 1, and in this bending degree, the wheel-legged robot 100 is higher. Due to different heights in FIG. 1 and FIG. 2, the balance of the wheel-legged robot is different, resulting in different balance control torques at the two heights.

The wheel 121 is a driving wheel, that is, the wheel 121 may rotate actively after being driven by the motor, so as to control the motion state of the wheel-legged robot 100, such as controlling the wheel-legged robot 100 to move forward, controlling the wheel-legged robot 100 to move backward, controlling the wheel-legged robot 100 to turn, or controlling the wheel-legged robot 100 to stand still.

Based on the structure of the base 110 and the wheel leg 120 in the wheel-legged robot 100, the wheel-legged robot 100 may be approximated to a trolley inverted pendulum structure, wherein the height of the wheel-legged robot 100 corresponds to the pendulum length in the inverted pendulum structure.

The weight of the wheel-legged robot 100 is mainly concentrated in the base 110 and the wheels 121, wherein the weight factor of the base 110 mainly includes four motors for driving the leg structures 122, a microcomputer, a circuit board, a motor, batteries, etc.

A dynamics model of the wheel-legged robot 100 may be expressed by the following formula 1:

$$(M+m)\ddot{x}+ml\cos(\theta)\ddot{\theta}-ml\sin(\theta)\dot{\theta}^2=u,$$

$$ml\cos\ddot{x}+ml^2\ddot{\theta}-mgl\sin(\theta)=0, \quad \text{Formula 1:}$$

wherein m is used for representing a mass of the body of the wheel-legged robot, that is, the base, M is used for representing a mass of the wheel of the wheel-legged robot 100, l represents a height of the current wheel-legged robot 100, that is, a height of the wheel-legged robot 100 under the current leg structure, and g represents an acceleration of gravity. x represents a distance of horizontal movement of the midpoint of the wheel on the ground, in a case that the wheel does not slip off the ground, x is equal to a linear distance between a wheel edge and a ground contact point when a wheel motor rotates, $\dot{x}$ represents a rotation linear velocity of the wheel, and $\ddot{x}$ represents a rotation linear acceleration, that is, the rotation linear acceleration. $\theta$ represents an inclination angle of the wheel-legged robot 100, $\dot{\theta}$ represents an inclination angular velocity of the wheel-legged robot 100, and $\ddot{\theta}$ represents an inclination acceleration of the wheel-legged robot 100. The inclination angle $\theta$ is taken as a pitch angle of the wheel-legged robot 100 as an example for description. u represents a thrust exerted on the wheel-legged robot 100, and there is a corresponding relationship between u and a torque exerted on the wheel.

Figure 3:
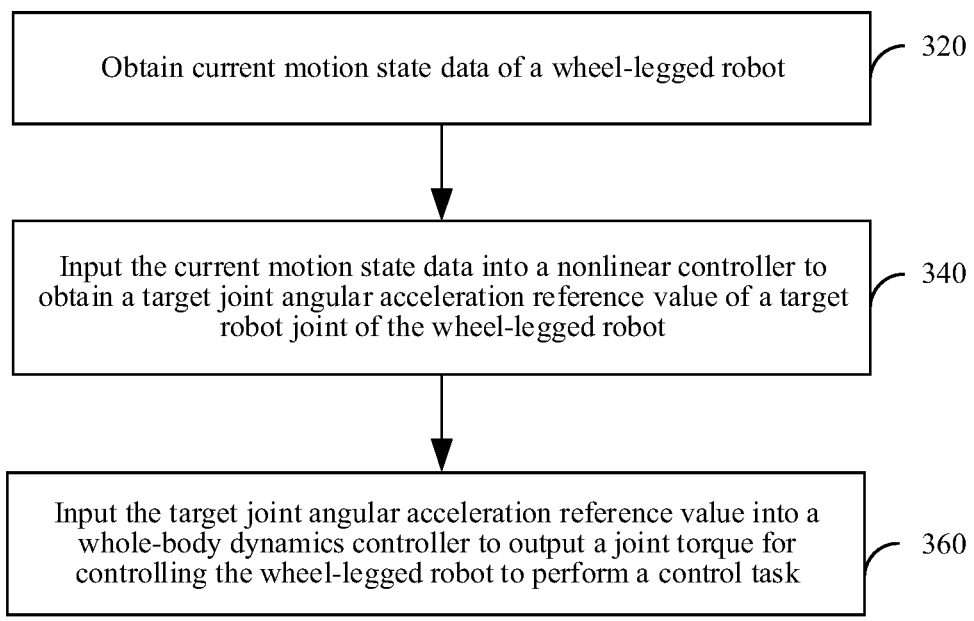
FIG. 3 is a flowchart of a method for controlling a wheel-legged robot according to some embodiments.

FIG. 3 shows a flowchart of a method for controlling a wheel-legged robot according to some embodiments. The method is applicable to a processor of the wheel-legged robot, and is performed by the processor. As shown in FIG. 3, the method includes:

Operation 320: Obtain current motion state data of the wheel-legged robot.

In some embodiments, basic data and current motion state data of the wheel-legged robot are obtained, and the basic data is used for representing structural features of the wheel-legged robot.

In some embodiments, the structural features of the wheel-legged robot include physical values of multiple parts of the robot. Taking the wheel-legged biped robot shown in FIG. 1 as an example, the wheel-legged robot includes, but is not limited to, a base and a wheel leg, and the wheel leg and the base are in an inverted pendulum structure. In other words, the control of the wheel leg may be linked to the control of the base. The inverted pendulum structure refers to a linkage structure that controls the leg structures and the base by controlling the wheels. The structural features include: a height of the current leg structure, a mass of the base, a mass of the wheel, a radius of the wheel, a distance between two wheels, etc. The structural features may further include linkage structures between parts. For example, taking the wheel-legged biped robot shown in FIG. 1 as an example, when the wheels are controlled to rotate clockwise to move rightward, the base and the wheel leg will move leftward relative to the wheels by means of linkage, and this linkage structure may also be reflected in the basic data. The specific form or content of the basic data is not limited herein.

In some embodiments, since the basic structure of the wheel-legged robot is fixed, some basic data may be preset. Taking the wheel-legged biped robot shown in FIG. 1 as an example, the first mass data of the base, the second mass data of the wheel in the wheel leg, the corresponding relationship between the angle of the leg structure and the height, etc. may be preset. In some embodiments, some basic data may also be obtained by computation. Taking the wheel-legged biped robot shown in FIG. 1 as an example, the height in the basic data may be computed based on the corresponding relationship according to an angle of the shank segment and the thigh segment in the leg structure.

Some embodiments, the current motion state data of the wheel-legged robot is used for representing motion features of the wheel-legged robot, which may include a joint angle and a joint angular velocity of each joint of the wheel-legged robot, or may further include other motion information of each joint according to actual needs, such as an inclination angle, an inclination angular velocity, a wheel rotation distance (that is, a movement distance of the wheel-legged robot), a wheel rotation linear velocity, etc. The specific form or content of the current motion state data is not limited herein.

In some embodiments, the current motion state data may include motion state data of the base and motion state data of the wheel leg.

The motion state data of the base is the information for representing the motion state of the base of the robot. For example, the motion state data of the base includes three-dimensional posture information of the robot, or may only include posture information of a two-dimensional posture controlled in the three-dimensional posture information, or may include height information of the current base, so as to facilitate the control of the height of the base.

The motion state data of the wheel leg is the information for representing the motion state and self-balance state of the wheel leg of the wheel-legged robot. For example, the motion state data of the wheel leg may include at least part of a current horizontal distance between a mass center of the wheel leg and a mass center of the base, a current relative velocity of the mass center of the wheel leg and the mass center of the base, a motion position of the wheel leg and a motion velocity of the wheel leg, or may include other balance motion parameter information according to actual needs.

The specific compositions of the motion state data of the base and the motion state data of the wheel leg are not limited herein.

In some embodiments, operation 320 may be implemented as follows: a sensor of the wheel-legged robot obtains sensor data of the wheel-legged robot; and then, a processor of the wheel-legged robot estimates the motion state of the wheel-legged robot based on the sensor data to obtain the current motion state data, wherein the sensor data includes: at least one of a left wheel angle and a left wheel angular velocity of the wheel-legged robot, at least one of a right wheel angle and a right wheel angular velocity of the wheel-legged robot, a pitch angle and an angular velocity thereof of the base, a roll angle and an angular velocity thereof of the base, a yaw angle and an angular velocity thereof of the base, and at least one of an angle and an angular velocity of a joint motor of the wheel-legged robot.

Operation 340: Input the current motion state data into a nonlinear controller to obtain a target joint angular acceleration reference value of a target robot joint of the wheel-legged robot.

In some embodiments, the target robot joint of the wheel-legged robot refers to some or all of the joints of the wheel-legged robot.

In some embodiments, the current motion state data is inputted into the nonlinear controller, and the processor of the wheel-legged robot obtains a target joint angular acceleration reference value of the wheel leg of the wheel-legged robot; or, the current motion state data is inputted into the nonlinear controller, and the processor obtains target joint angular acceleration reference values of all joints of the wheel-legged robot, etc. The number and range of the target robot joints are not limited herein.

In some embodiments, the target joint angular acceleration reference value of the target robot joint includes: a joint angular acceleration reference value of the wheel leg of the wheel-legged robot, or a joint angular acceleration reference value of the base of the wheel-legged robot and a joint angular acceleration reference value of the wheel leg of the wheel-legged robot.

In some embodiments, in a case that the wheel-legged robot is a wheel-legged biped robot, the joint angular acceleration reference value of the wheel leg of the wheel-legged robot includes a joint angular acceleration reference value of a left wheel leg and a joint angular acceleration reference value of a right wheel leg.

It can be seen from the above formula 1 that the dynamics model of the wheel-legged robot is nonlinear, therefore, the above formula 1 is deformed first and divided into a formula 2 and a formula 3 as follows.

$$u = ml\left(\frac{g}{l}\cos(\theta)\sin(\theta) - \sin(\theta)\dot{\theta}^2 + \frac{\sin^2(\theta) + M/m}{l}v\right), \quad \text{Formula 2}$$

$$\ddot{\theta} = \frac{g}{l}\sin(\theta) - \frac{1}{l}\cos(\theta)v \quad \text{Formula 3}$$

$$\frac{\ddot{x}}{r} = v$$

wherein v represents a target joint angular acceleration reference value of a target robot joint of the wheel-legged robot, m is used for representing a mass of the body of the wheel-legged robot, that is, the base, M is used for representing a mass of the wheel of the wheel-legged robot, r represents a radius of the wheel, l represents a height of the current wheel-legged robot, that is, a height of the wheel-legged robot under the current leg structure, and g represents an acceleration of gravity. $\ddot{x}$ represents a linear acceleration of the wheel. $\theta$ represents an inclination angle of the wheel-legged robot, $\dot{\theta}$ represents an inclination angular velocity of the wheel-legged robot, and $\ddot{\theta}$ represents an inclination acceleration of the wheel-legged robot. The inclination angle $\theta$ is taken as a pitch angle of the wheel-legged robot as an example for description. u represents a balance torque, that is, a thrust exerted on the wheel-legged robot, and there is a corresponding relationship between u and a torque exerted on the wheel.

In some embodiments, based on the current motion state data, with the goal that a linear part of the dynamics relationship of the wheel-legged robot conforms to a target balance state, the processor of the wheel-legged robot determines the target joint angular acceleration reference value of the target robot joint of the wheel-legged robot by the nonlinear controller.

In some embodiments, the nonlinear controller may be obtained by the following operations: determine an original energy relationship of the wheel-legged robot, the original energy relationship including an original potential energy, and the original potential energy having an unsteady property; determine a variable energy relationship of the wheel-legged robot, the variable energy relationship including a variable potential energy, the variable potential energy having a steady property, and the value of the variable potential energy being minimum in a case that the wheel-legged robot is in a target balance state; and determine the nonlinear controller with the goal of changing the original energy relationship into the variable energy relationship.

The nonlinear controller corresponds to the original energy relationship and the variable energy relationship.

In some embodiments, the original energy relationship and the variable energy relationship are determined. The original energy relationship includes an original potential energy, and the original potential energy has an unsteady property. The unsteady property means that in a computation curve of the original potential energy, in a case that the original potential energy is at the maximum value, the wheel-legged robot is in a target balance state, and the maximum value of the original potential energy is unsteady. The variable energy relationship includes a variable potential energy, the variable potential energy has a steady property, and the value of the variable potential energy is minimum in a case that the wheel-legged robot is in a target balance state. The steady property means that in a computation curve of the variable potential energy, in a case that the variable potential energy is at the minimum value, the wheel-legged robot is in a target balance state, and the minimum value of the variable potential energy is steady.

In some embodiments, the original energy relationship is shown in the following formula 4.

$$H(q, p) = \frac{1}{2}p^T M_I(q)^{-1} p + V(q), \quad \text{Formula 4}$$

wherein q represents a momentum, p represents an angular momentum, $p=[\dot{\theta}\dot{x}]^T$, $q=[\theta x]^T$, an inertial matrix $M_I=[1\ 0;\ 0\ 1]$, and an original potential energy $V=\cos(\theta)g/l$.

In some embodiments, the variable energy relationship is shown in the following formula 5.

$$H_d(q, p) = \frac{1}{2}p^T M_d(q)^{-1} p + V_d(q), \quad \text{Formula 5}$$

wherein $V_d$ represents a variable potential energy, the variable potential energy has a steady property, and an expression of the variable potential energy refers to the following formula 6.

$$V_d(q) = \frac{3gl}{k\cos(\theta)} + \frac{p}{2}\left[x - x^* + 3l\ln(\sec(\theta) + \tan(\theta)) + \frac{6lm_{22}^0}{k}\tan(\theta)\right]^2, \quad \text{Formula 6}$$

wherein k represents a free parameter, which may be verified by a Lyapunov function, and in a case that the variable potential energy is minimum, the wheel-legged robot may be stabilized in a target balance state x*.

$M_d$ represents a preset matrix and is positive definite within a pitch angle range $$\theta \in \left(-\frac{\pi}{2}, \frac{\pi}{2}\right),$$

referring to the following formula 7.

$$M_d = \begin{bmatrix} m_{11} & m_{12} \\ m_{12} & m_{22} \end{bmatrix} = \begin{bmatrix} \frac{k}{3l^2}\cos^3(\theta) & -\frac{k}{2l}\cos^2(\theta) \\ -\frac{k}{2l}\cos^2(\theta) & k\cos(\theta) + m_{22}^0 \end{bmatrix},$$ Formula 7 wherein $m_{11}$ is a mathematical variable representing $$\frac{k}{3l^2}\cos^3(\theta),$$

$m_{12}$ is a mathematical variable representing $$-\frac{k}{2l}\cos^2(\theta),$$

and $m_{22}$ is a mathematical variable representing $k\cos(\theta) + m_{22}^0$.

θ represents an inclination angle of the wheel-legged robot, l represents a height of the current wheel-legged robot, and k and $m_{22}^0$ represent predefined free parameters, wherein k>0, and $m_{22}^0 \geq 0$.

In some embodiments a target joint angular acceleration reference value v of the target robot joint of the wheel-legged robot is determined with the goal of changing the original energy relationship shown in formula 4 into the variable energy relationship shown in formula 5.

When the target joint angular acceleration reference value v of the target robot joint of the wheel-legged robot is determined, for different control goals, the processor of the wheel-legged robot determines the target joint angular acceleration reference value v of the wheel-legged robot by different modes, including at least the following two cases:

1. The wheel-legged robot is controlled to be balanced and fixed at a balance point x*.

In some embodiments, the target joint angular acceleration reference value of the target robot joint of the wheel-legged robot is determined based on the following formula 8.

$$v = A_1(\theta)p(x-x^*) + p^T A_2(\theta)p + A_3(\theta) - k_v A_4(\theta)p,$$ Formula 8:

wherein $p=[\dot{\theta}\dot{x}]^T$, $k_v$ represents a free parameter during damping injection, v represents a target joint angular acceleration reference value of the target robot joint of the wheel-legged robot, x represents a rotation distance of the wheel of the wheel-legged robot, x* represents a balance point of the wheel in a target balance state, θ represents an inclination angle of the wheel-legged robot, and $A_1$, $A_2$, $A_3$, and $A_4$ represent preset parameter computation expressions. As a result, when the wheel-legged robot is controlled, the wheel-legged robot is controlled to be balanced and fixed at the balance point x* by means of the balance torque.

The computation modes of the above $A_1$, $A_2$, $A_3$, and $A_4$ refer to the following formulae 9 to 12.

$$A_1 = -\left(m_{12}\frac{dF}{d\theta} + m_{22}\right),$$ Formula 9

$$A_2 = -\frac{1}{2}m_{12}M_d^{-1}\begin{bmatrix} \frac{dm_{11}}{d\theta} - \alpha_{11} & \frac{dm_{12}}{d\theta} \\ \frac{dm_{12}}{d\theta} - \alpha_{12} & \frac{dm_{22}}{d\theta} \end{bmatrix}M_d^{-1},$$ Formula 10

$$A_3 = m_{12}\frac{6gl\sin(\theta)}{k\cos^3(\theta)} + PF(\theta)A_1,$$ Formula 11

$$A_4 = \left[-\frac{\cos(\theta)}{l}1\right]M_d^{-1},$$ Formula 12 wherein $m_{11}$, $m_{12}$ and $m_{22}$ refer to the above formula 7, $$\frac{dF}{d\theta}$$

represents a differential of a function F(θ) at θ, and the computation mode of F(θ) is shown in the following formula 13:

$$F(\theta) = 3l\ln(\sec(\theta) + \tan(\theta)) + \frac{6lm_{22}^0}{k}\tan(\theta).$$ Formula 13

The computation mode of $\alpha_{11}$ and $\alpha_{12}$ is shown in the following formula 14:

$$\alpha_1 = \begin{bmatrix} \alpha_{11} \\ \alpha_{12} \end{bmatrix} = \frac{-k^2\cos^3(\theta)\sin(\theta)}{12l^2}\begin{bmatrix} \frac{\cos(\theta)}{l} \\ -1 \end{bmatrix}.$$ Formula 14

$\alpha_{11}$ represents a first row obtained by the above matrix product, and $\alpha_{12}$ represents a second row obtained by the above matrix product.

A target joint angular acceleration reference value v of the target robot joint of the wheel-legged robot corresponding to the adjustment from the current wheel to a balance point x* is computed based on the above formula 8, so as to control the wheel-legged robot to be fixed at a balance point $[0\ 0\ x^*0]^T$. That is, the current computed target joint angular acceleration reference value v may make $H_d$ in formula 5 meet $$\lim_{t\to\infty}\theta(t) = 0 \text{ and } \lim_{t\to\infty}x(t) = x^*, \lim_{t\to\infty}\dot{\theta}(t) = 0$$

represents that an inclination angle is 0, and $$\lim_{t\to\infty}x(t) = x^*$$

represents that the wheel-legged robot is in a balance point x*, wherein the balance point x* is a value specified in real time, such as a value determined according to a control operation of the wheel-legged robot.

2. The wheel-legged robot is controlled to move at a uniform velocity in a target balance state.

In some embodiments, a target joint angular acceleration reference value is determined based on the following formula 15.

$$v=\bar{p}^T A_2(\theta)\bar{p}+A_3(\theta)-k_v A_4(\theta)\bar{p},\qquad \text{Formula 15:}$$

wherein $\bar{p}=[\dot{\theta}\,\dot{x}-\dot{x}^*]^T$, $\theta$ represents an inclination angle of the wheel-legged robot, $k_v$ represents a free parameter during damping injection, and $A_1$, $A_2$, $A_3$, and $A_4$ represent preset parameter computation expressions, which may refer to formulae 9 to 12. As a result, when the wheel-legged robot is controlled, the wheel-legged robot is controlled to move at a uniform velocity of $\dot{x}^*$ in a target balance state by means of the balance torque.

A target joint angular acceleration reference value v of the target robot joint of the wheel-legged robot corresponding to the adjustment from a current wheel linear velocity $\dot{x}$ to a target velocity $\dot{x}^*$ is computed based on the above formula 15, so as to control the wheel-legged robot to move at a uniform velocity of $\dot{x}^*$. That is, the current computed target joint angular acceleration reference value v may make $H_d$ in formula 5 meet $$\lim_{t\to\infty}\theta(t)=0 \text{ and } \lim_{t\to\infty}\dot{x}(t)=\dot{x}^*,\ \lim_{t\to\infty}\dot{\theta}(t)=0$$

represents that an inclination angle is 0, and $$\lim_{t\to\infty}\dot{x}(t)=\dot{x}^*$$

represents that the motion velocity of the wheel-legged robot is $\dot{x}^*$, wherein the balance point $\dot{x}^*$ is a value specified in real time, such as a value determined according to a control operation of the wheel-legged robot.

Operation 360: Input the target joint angular acceleration reference value into a whole-body dynamics controller to output a joint torque for controlling the wheel-legged robot to perform a control task.

The whole-body dynamics controller includes a series of equations formed by control tasks and constraint conditions.

The processor of the wheel-legged robot solves a secondary optimization problem with the control goal of the target joint angular acceleration reference value by the whole-body dynamics controller on the premise of meeting constraint conditions, so as to obtain a joint torque for controlling the wheel-legged robot to perform a control task.

In some embodiments, the constraint conditions include: at least two of a friction cone constraint, a closed-loop linkage constraint and a dynamics constraint, wherein the friction cone constraint is used for constraining a reacting force of a bearing surface to meet a friction cone, and the reacting force of the bearing surface refers to an acting force of the bearing surface on the wheel-legged robot; the closed-loop linkage constraint is used for constraining a leg linkage structure of the wheel-legged robot; and the dynamics constraint is used for constraining the control task based on a dynamics model of the wheel-legged robot.

The control task includes a self-balance task, an action task, etc. The action task is divided into a static action task and a dynamic action task.

The static action task includes: a roll task of a wheel of the wheel-legged robot; a height task of the base of the wheel-legged robot; a roll task of the base; a pitching task of the base; a yaw task of the base; a tail control task of the base; a balance task of the wheel leg, etc.

The dynamic action task includes: a jump task, a two-wheel alternating step walking task, an obstacle avoiding task with one wheel supporting and the other wheel off the ground, etc.

In conclusion, according to the method for controlling a wheel-legged robot provided by some embodiments, by obtaining the current motion state data of the wheel-legged robot and inputting the current motion state data into the nonlinear controller, the processor of the wheel-legged robot obtains the target joint angular acceleration reference value of the target robot joint of the wheel-legged robot; and by inputting the target joint angular acceleration reference value of the target robot joint of the wheel-legged robot, determined by the nonlinear controller, into the whole-body dynamics controller, the processor may obtain the joint torque for controlling the wheel-legged robot to perform the control task. The method provided by some embodiments combines a nonlinear control method and a whole-body dynamics control method, so that in a process of controlling the robot, the accuracy of balance control of the wheel-legged robot may be improved by the nonlinear control method, and flexible control of the robot may also be achieved by the whole-body dynamics method, thereby improving the flexibility and control effect of implementing flexible control of the robot.

Some embodiments further provide determination modes of the nonlinear controller.

In some embodiments, for different control goals, two determination modes of the target joint angular acceleration of the target robot joint are provided respectively: when the control goal is to control the wheel-legged robot to be balanced and fixed at the balance point x*, the target joint angular acceleration reference value of the target robot joint of the wheel-legged robot may be determined by formula 8; and when the control goal is to control the wheel-legged robot to move at a uniform velocity in a target balance state, the target joint angular acceleration reference value may be determined by formula 15.

Some embodiments further provide an obtaining mode of the current motion state data of the wheel-legged robot. The motion state of the wheel-legged robot may be estimated based on the sensor data to obtain the current motion state data, so as to improve the accuracy of data determination.

Some embodiments show a process of obtaining the target joint angular acceleration reference value of the target robot joint of the wheel-legged robot by the nonlinear controller based on the current motion state data, and inputting the target joint angular acceleration reference value into the whole-body dynamics controller to obtain the joint torque of each joint in a case that the wheel-legged robot performs the control task. Taking the control task which a self-balance task as an example, the following embodiment elaborates a method for determining the joint torque of each joint of the wheel-legged robot by the whole-body dynamics controller.

Figure 4:
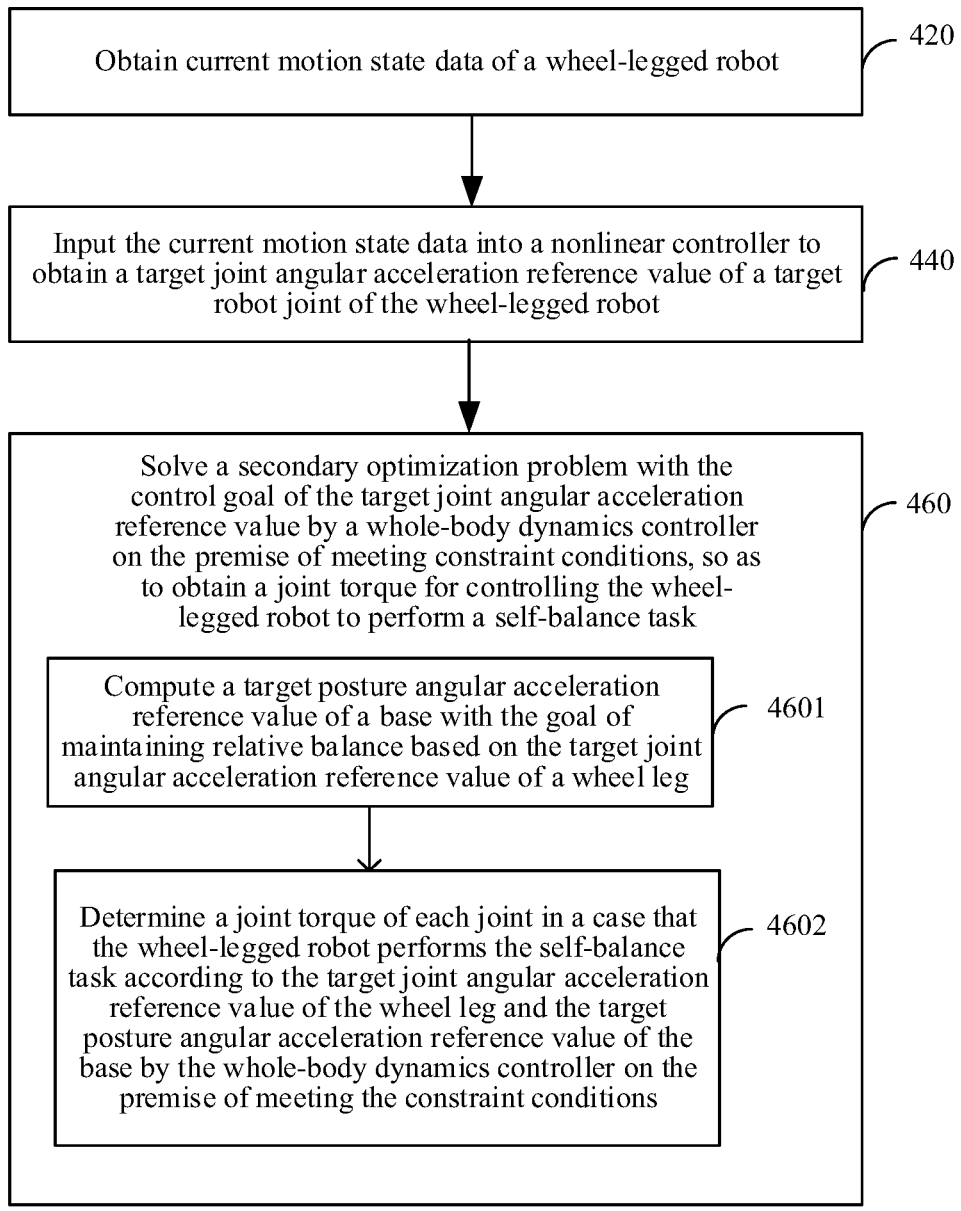
FIG. 4 is a flowchart of a method for controlling a wheel-legged robot according to some embodiments.

FIG. 4 shows a flowchart of a method for controlling a wheel-legged robot according to some embodiments. The method is applicable to a processor of the wheel-legged robot, and is performed by the processor. As shown in FIG. 4, the method includes:

Operation 420: Obtain current motion state data of the wheel-legged robot.

The obtaining mode of the motion state data is described in operation 320, and will not be repeated here.

Operation 440: Input the current motion state data into a nonlinear controller to obtain a target joint angular acceleration reference value of a target robot joint of the wheel-legged robot.

The mode of determining the target joint angular acceleration reference value based on the current motion state data is described in operation 440, and will not be repeated here.

Operation 460: Input the target joint angular acceleration reference value into a whole-body dynamics controller to output a joint torque for controlling the wheel-legged robot to perform a self-balance task.

In some embodiments, taking the control task which is a self-balance task as an example, the controller of the wheel-legged robot inputs the target joint angular acceleration reference value of the target robot joint of the wheel-legged robot into the whole-body dynamics controller, an optimal solution closest to the target joint angular acceleration reference value for controlling the wheel-legged robot to perform the self-balance task is found as the output of the whole-body dynamics controller, and the joint torque of the output is used for controlling the wheel-legged robot to perform the self-balance task.

In some embodiments, taking the control task which is a self-balance task as an example, a process of computing the joint torque according to the inputted target joint angular acceleration reference value of the target robot joint of the wheel-legged robot through the whole-body dynamics controller is shown by the following sub-operations 4601 and 4602:

Operation 4601: Compute a target posture angular acceleration reference value of the base with the goal of maintaining relative balance based on the target joint angular acceleration reference value of the wheel leg; and input the target joint angular acceleration reference value of the wheel leg, determined in operation 440, into the whole-body dynamics controller. Since the base is connected to the wheel leg through a bracket, or the connection between the base and the wheel leg is achieved in other modes, the target posture angular acceleration reference value of the base may be determined based on the target joint angular acceleration reference value of the wheel leg.

In order to enable the wheel-legged robot to achieve the self-balance task, during the motion of the robot, the horizontal distance between the mass center of the wheel leg and the mass center of the base of the wheel-legged robot is controlled to be less than a target horizontal distance threshold, and a relative velocity of the mass center of the wheel leg and the mass center of the base is controlled to be less than a target relative velocity threshold. The target horizontal distance threshold is used for indicating a horizontal distance between the mass center of the wheel leg and the mass center of the base for maintaining the entire mass center of the wheel-legged robot stable. The target relative velocity threshold is used for indicating a relative velocity of the mass center of the wheel leg and the mass center of the base for maintaining the wheel-legged robot stable.

In some embodiments, in order to maintain relative balance of the wheel-legged robot, during the motion of the robot, the horizontal distance between the mass center of the wheel leg and the mass center of the base of the wheel-legged robot is controlled to be less than the minimum value of the distance between the mass center of the wheel leg and each edge of the wheel leg; the relative velocity of the mass center of the wheel leg and the mass center of the base of the wheel-legged robot is controlled to be 0 or close to 0, so that the mass center of the base is always located in an area of the wheel leg; and there is no relative motion between the base and the wheel leg, so as to ensure that the wheel-legged robot maintains a balance state during the motion.

The target posture angular acceleration reference value of the base is computed based on the target joint angular acceleration reference value of the wheel leg, the horizontal distance between the mass center of the wheel leg and the mass center of the base, and the relative velocity of the mass center of the wheel leg and the mass center of the base. The mass center of the wheel leg is set for maintaining the relative balance of the wheel-legged robot.

Operation 4602: Determine a joint torque of each joint in a case that the wheel-legged robot performs the self-balance task according to the target joint angular acceleration reference value of the wheel leg and the target posture angular acceleration reference value of the base by the whole-body dynamics controller on the premise of meeting the constraint conditions.

In some embodiments, a target motion acceleration of the wheel-legged robot is determined based on the target joint angular acceleration reference value of the wheel leg and the target posture angular acceleration reference value of the base; an estimator of the target motion acceleration of the wheel-legged robot is determined based on the current motion state data; and the joint torque of each joint in a case that the wheel-legged robot performs the self-balance task is determined based on the target motion acceleration and the estimator of the target motion acceleration of the wheel-legged robot on the premise of meeting the constraint conditions.

The joint torque serves as the output of the whole-body dynamics controller to control each joint motor of the wheel-legged robot, so as to enable the robot to achieve the self-balance task.

In some embodiments, the processor of the wheel-legged robot determines the joint torque of each joint based on the joint target motion acceleration of each joint of the wheel-legged robot, and performs friction compensation for the joint torque, a joint control current value is generated based on the joint torque after friction compensation, and the joint control current value is sent to a corresponding joint control motor, so that a corresponding torque is outputted through the motor to achieve the control of each joint of the wheel-legged robot, so as to achieve the motion control of the wheel-legged robot.

In conclusion, in the method for controlling a wheel-legged robot provided by some embodiments, in a case that the control task includes a self-balance task, by using the target joint angular acceleration reference value of the target robot joint of the wheel-legged robot, determined in the nonlinear controller, as the input of the whole-body dynamics controller, the processor of the wheel-legged robot may determine the target motion acceleration when the wheel-legged robot performs the self-balance task, then, the target motion acceleration of the wheel-legged robot is converted to the joint target motion acceleration of each joint of the wheel-legged robot based on the constraint conditions, and finally, the joint target motion acceleration is converted to the joint torque of each joint so as to be outputted. Some embodiments provide a method for computing a joint torque of each joint when a wheel-legged robot performs a self-balance task, which mainly uses a whole-body dynamics controller to analyze and process a nonlinear joint angular acceleration to obtain the joint torque of each joint for controlling the wheel-legged robot to perform the task, thereby achieving the optimization control of the flexible control of the wheel-legged robot on the basis of the accurate balance control of the wheel-legged robot.

Some embodiments show a process of a method for controlling a wheel-legged robot, which combines a nonlinear control method and a whole-body dynamics method. The method may combine the advantages of the nonlinear control method and the whole-body dynamics control method, thereby providing a more optimized control method. Some embodiments show an implementation process of obtaining an action reference trajectory by adding a user control input or based on a motion state input on the basis of the embodiments shown in FIG. 3 and FIG. 4.

Figure 5:
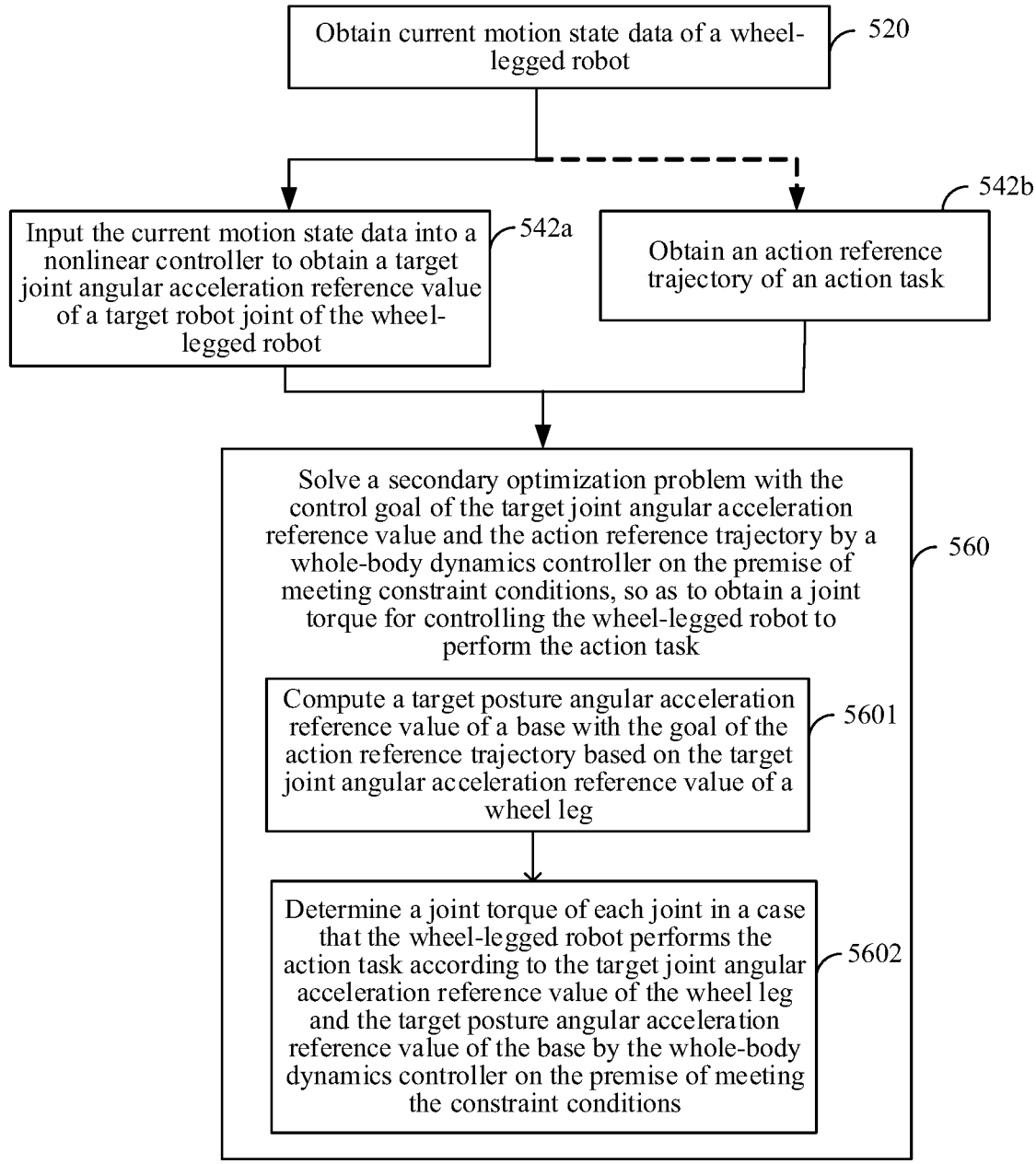
FIG. 5 is a flowchart of a method for controlling a wheel-legged robot according to some embodiments.

FIG. 5 shows a flowchart of a method for controlling a wheel-legged robot according to some embodiments. The method is applicable to a processor of the wheel-legged robot, and is performed by the processor. As shown in FIG. 5, the method includes:

Operation 520: Obtain current motion state data of the wheel-legged robot.

The obtaining mode of the motion state data is described in operation 320, and will not be repeated here.

Operation 542*a*: Input the current motion state data into a nonlinear controller to obtain a target joint angular acceleration reference value of a target robot joint of the wheel-legged robot.

The mode of determining the target joint angular acceleration reference value of the target robot joint of the wheel-legged robot based on the current motion state data is described in operation 440, and will not be repeated here.

Operation 542*b*: Obtain an action reference trajectory of an action task.

In some embodiments, the action reference trajectory of the action task is used for representing the expected motion information of the wheel-legged robot at a target time, wherein the target time may be the next time of the current time or the time after the preset time interval of the current time.

In some embodiments, the action reference trajectory includes the information of an expected motion state and an expected self-balance state of the wheel-legged robot at the target time, such as at least part of a target horizontal distance between the mass center of the wheel leg and the mass center of the base, a target relative velocity of the mass center of the wheel leg and the mass center of the base, a target motion position of the wheel leg and a target motion velocity of the wheel leg, or may include other motion parameter information according to actual situations.

The processor of the wheel-legged robot may obtain an action reference trajectory of the action task based on a user control input; or the processor inputs the current motion state data into a trajectory generator of the action task to obtain an action reference trajectory of the action task.

In some embodiments, the processor receives a user control input from a remote controller, and determines an action reference trajectory of the action task based on the user control input; or the processor inputs the current motion state data into a walking motion trajectory generator to obtain an action reference trajectory for controlling the wheel-legged robot to perform a two-wheel alternating step walking task; or the processor inputs the current motion state data into a jump trajectory generator to obtain an action reference trajectory for controlling the wheel-legged robot to perform a jump task.

In some embodiments, the action reference trajectory of the two-wheel alternating step walking task includes at least one of the following: an action reference trajectory when a left leg supports and a right leg lifts, an action reference trajectory when the right leg supports and the left leg falls to the ground, an action reference trajectory when the left leg support is switched to the right leg support, and an action reference trajectory when the right leg support is switched to the left leg support.

In some embodiments, the action reference trajectory of the jump task includes at least one of the following: an action reference trajectory in a takeoff stage, an action reference trajectory in an air stage, and an action reference trajectory in a ground stage.

In some embodiments, taking the process of inputting the current motion state data into a jump trajectory generator to obtain an action reference trajectory for controlling the wheel-legged robot to perform a jump task as an example, a process of obtaining an action reference trajectory of the action task includes:

Operation 1: Obtain a simplified model for the wheel-legged robot to perform a jump task.

For example, a leg of the wheel-legged robot is simplified into a retractable rod which may exert an active force, the base of the wheel-legged robot is simplified into a floating base, the tail and base of the wheel-legged robot are simplified into a single rigid body, etc.

Operation 2: Substitute the current motion state data into a dynamics model for the wheel-legged robot to perform a jump task to obtain a dynamics equation for performing the jump task.

In some embodiments, the current motion state data includes: a joint angle and an angular velocity of the wheel-legged robot, etc.

Operation 3: Set constraint conditions.

In some embodiments, the constraint conditions include: friction cone constraints, closed-loop linkage constraints, dynamics constraints, path constraints and boundary constraints in different stages, continuity constraints between different stages, etc. In a case that wheels of the wheel-legged robot are in contact with the ground, the constraint conditions include: a friction cone constraint, a closed-loop linkage constraint and a dynamics constraint; and in a case that wheels of the wheel-legged robot are not in contact with the ground, the constraint conditions include: the closed-loop linkage constraint and the dynamics constraint.

Operation 4: Compute an action reference trajectory for controlling the wheel-legged robot to perform a jump task.

An optimal solution in a case that the wheel-legged robot performs the jump task is selected based on the constraint conditions, so as to determine planned position and posture data at multiple time points in a case that the wheel-legged robot performs the jump task, that is, the action reference trajectory in a case that the wheel-legged robot performs the jump task. In some embodiments, the multiple time points are multiple time points with a control step size of 1 ms, and each time point corresponds to a set of planned position data of the wheel-legged robot.

A specific mode of obtaining an action reference trajectory of the action task is not limited herein.

Operation 560: Input the target joint angular acceleration reference value and the action reference trajectory into the whole-body dynamics controller to output a joint torque for controlling the wheel-legged robot to perform the action task.

In some embodiments, the action task performed by the wheel-legged robot includes at least one of the following: a roll task of a wheel of the wheel-legged robot; a height task of the base of the wheel-legged robot; a roll task of the base; a pitching task of the base; a yaw task of the base; a tail control task of the base; and a balance task of the wheel leg.

In some embodiments, the constraint conditions include: at least two of a friction cone constraint, a closed-loop linkage constraint and a dynamics constraint, wherein the friction cone constraint is used for constraining a reacting force of a bearing surface to meet a friction cone, and the reacting force of the bearing surface refers to an acting force of the bearing surface on the wheel-legged robot; the closed-loop linkage constraint is used for constraining a leg linkage structure of the wheel-legged robot; and the dynamics constraint is used for constraining the control task based on a dynamics model of the wheel-legged robot.

In a case that wheels of the wheel-legged robot are in contact with the ground, the constraint conditions include: a friction cone constraint, a closed-loop linkage constraint and a dynamics constraint; and in a case that wheels of the wheel-legged robot are not in contact with the ground, the constraint conditions include: the closed-loop linkage constraint and the dynamics constraint.

The processor of the wheel-legged robot solves a secondary optimization problem with the control goal of the joint angular acceleration and the action reference trajectory by the whole-body dynamics controller on the premise of meeting constraint conditions, so as to obtain a joint torque for controlling the wheel-legged robot to perform an action task.

In some embodiments, taking the action reference trajectory which is an action reference trajectory for controlling the wheel-legged robot to perform a two-wheel alternating step walking task, obtained by a walking motion trajectory generator, as an example, a process of computing a joint torque according to the inputted target joint angular acceleration reference value of the target robot joint of the wheel-legged robot and the action reference trajectory through the whole-body dynamics controller is shown in the following operations 5601 and 5602:

Operation 5601: compute a target posture angular acceleration reference value of the base with the goal of the action reference trajectory based on the target joint angular acceleration reference value of the wheel leg; and input the target joint angular acceleration reference value of the wheel leg, determined in operation 542*a*, into the whole-body dynamics controller.

Since the base is connected to the wheel leg through a bracket, or the connection between the base and the wheel leg is achieved in other modes, in order to enable the wheel-legged robot to achieve the action task, during the motion of the robot, posture adjustment of the base is achieved by controlling the target joint angular acceleration of the wheel leg of the wheel-legged robot so as to achieve the action task. As a result, the processor of the wheel-legged robot determines the target posture angular acceleration reference value of the base with the goal of the action reference trajectory based on the target joint angular acceleration reference value of the wheel leg.

The action reference trajectory is a sequence including planned position and posture data of the wheel-legged robot at multiple time points. The planned position and posture data includes a target posture of the base of the wheel-legged robot, etc.

In some embodiments, the processor of the wheel-legged robot determines the target posture of the base of the wheel-legged robot at the target time in the position and posture data sequence indicated by the action reference trajectory, and determines the target posture angular acceleration reference value of the base with reference to the target joint angular acceleration reference value of the wheel leg.

Operation 5602: Determine a joint torque of each joint in a case that the wheel-legged robot performs the action task according to the target joint angular acceleration reference value of the wheel leg and the target posture angular acceleration reference value of the base by the whole-body dynamics controller on the premise of meeting the constraint conditions.

In some embodiments, the processor of the wheel-legged robot determines a target motion acceleration of the wheel-legged robot based on the target joint angular acceleration reference value of the wheel leg and the target posture angular acceleration reference value of the base; the processor determines an estimator of the target motion acceleration of the wheel-legged robot based on the current motion state data; and the processor determines the joint torque of each joint in a case that the wheel-legged robot performs the action task based on the target motion acceleration and the estimator of the target motion acceleration of the wheel-legged robot on the premise of meeting the constraint conditions.

The joint torque serves as the output of the whole-body dynamics controller to control each joint motor of the wheel-legged robot, so as to enable the robot to achieve the two-wheel alternating step walking task.

In some embodiments, the processor of the wheel-legged robot determines the joint torque of each joint based on the joint target motion acceleration of each joint of the wheel-legged robot, and performs friction compensation for the joint torque, a joint control current value is generated based on the joint torque after friction compensation, and the joint control current value is sent to a corresponding joint control motor, so that a corresponding torque is outputted through the motor to achieve the control of each joint of the wheel-legged robot, so as to achieve the motion control of the wheel-legged robot.

In conclusion, in the method for controlling a wheel-legged robot provided by some embodiments, in a case that the control task includes an action task, by inputting the target joint angular acceleration reference value of the target robot joint of the wheel-legged robot and the action reference trajectory, outputted by the nonlinear controller, into the whole-body dynamics controller together, the processor of the wheel-legged robot obtains the joint torque for controlling the wheel-legged robot to perform the control task. The method provided by some embodiments achieves the control of the wheel-legged robot to perform the action task on the basis of completing the basic self-balance task of the wheel-legged robot. Moreover, the nonlinear control method and the whole-body dynamics control method are combined, so that the wheel-legged robot may complete various action tasks flexibly, accurately and stably, and the control accuracy of the wheel-legged robot is improved.

Some embodiments further provide two different obtaining modes of the action reference trajectory of the action task to ensure the accuracy of the action reference trajectory. The action reference trajectory may be determined by receiving a user control input from a remote controller; or the current motion state data may be inputted into a trajectory generator of the action task to obtain the action reference trajectory. The trajectory generator includes a walking motion trajectory generator and/or a jump trajectory generator.

Some embodiments further provide the constraints specifically included in the constraint conditions, and provides the specific constraint conditions of the wheel-legged robot in a case that wheels are in contact with the ground and in a case that wheels are not in contact with the ground, thereby providing an accurate basis for determining the target joint angular acceleration reference value of the target robot joint.

Figure 6:
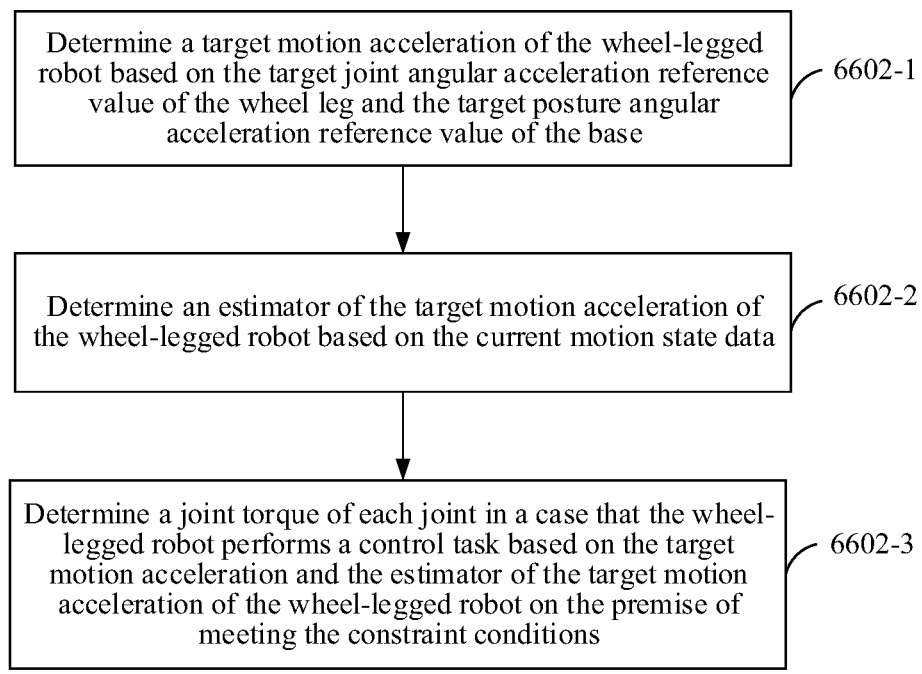
FIG. 6 is a flowchart of a method for determining a joint torque of each joint of a wheel-legged robot in a case that the wheel-legged robot performs a control task according to some embodiments.

The difference between sub-operation 4602 in some embodiments as shown in FIG. 4 and sub-operation 5602 in some embodiments as shown in FIG. 5 is only that the control tasks achieved by the wheel-legged robot are different, but the processes of implementing this operation in the two embodiments are similar. FIG. 6 shows a flowchart of a method for determining a joint torque of each joint of a wheel-legged robot in a case that the wheel-legged robot performs a control task according to some embodiments. The method is applicable to a processor of the wheel-legged robot, and is performed by the processor.

A process of determining the joint torque of each joint in a case that the wheel-legged robot performs the control task according to the target joint angular acceleration reference value of the wheel leg and the target posture angular acceleration reference value of the base by the whole-body dynamics controller on the premise of meeting constraint conditions is described in detail in some embodiments as shown in FIG. 6 below.

Operation 6602-1: Determine a target motion acceleration of the wheel-legged robot based on the target joint angular acceleration reference value of the wheel leg and the target posture angular acceleration reference value of the base.

In some embodiments, the target motion acceleration of the wheel-legged robot refers to an acceleration of the entire wheel-legged robot obtained by comprehensively considering a balance motion process of the wheel-legged robot and a posture adjustment process of the base of the wheel-legged robot.

In some embodiments, the target posture angular acceleration reference value of the base and the target joint angular acceleration reference value of the wheel leg of the wheel-legged robot are normalized based on the preset weight, and an acceleration vector or an acceleration matrix obtained by normalization is used as the target motion acceleration of the wheel-legged robot. A specific mode of generating the target motion acceleration of the wheel-legged robot and specific compositions and dimensions of the target motion acceleration of the wheel-legged robot are not limited herein.

Operation 6602-2: Determine an estimator of the target motion acceleration of the wheel-legged robot based on the current motion state data.

According to a corresponding relationship between a joint motion process of the wheel-legged robot and a dynamics motion process of the wheel-legged robot, the processor of the wheel-legged robot substitutes the current motion state data into a preset equation to compute and generate an estimator of the target motion acceleration of the wheel-legged robot, or other modes may be used for generating an estimator of the target motion acceleration of the wheel-legged robot. A specific process of generating an estimator of the target motion acceleration is not limited herein.

It is to be understood that the performing sequence of operation 6602-1 and operation 6602-2 is not limited herein. Operation 6602-1 may be performed first, and then, operation 6602-2 is performed; or, operation 6602-2 is performed first, and then, operation 6602-1 is performed; or, operation 6602-1 and operation 6602-2 are performed at the same time.

Operation 6602-3: Determine a joint torque of each joint in a case that the wheel-legged robot performs the control task based on the target motion acceleration and the estimator of the target motion acceleration of the wheel-legged robot on the premise of meeting constraint conditions.

In some embodiments, the constraint conditions are used for indicating the constraint relationship between the motion information and joint motion information of the wheel-legged robot. Specifically, the constraint conditions are used for defining the constraint conditions and constraint relationships that each joint of the wheel-legged robot needs to meet during the motion of the wheel-legged robot, so that the physical motion information of the wheel-legged robot and the joint motion information of the wheel-legged robot may be mapped to each other, and the data obtained by mapping is in a reasonable range meeting physical motion constraints.

In some embodiments, a constraint function may be formed based on a dynamics equation and constraint conditions of the wheel-legged robot, or may be computed and generated based on a kinematics equation by a preset algorithm. For example, the constraint function may further include one or more of an equality constraint subfunction, an inequality constraint subfunction and a threshold constraint subfunction. Specific compositions of the constraint function and a specific mode of generating the constraint function are not limited herein.

In some embodiments, a specific process of determining the joint torque of each joint of the wheel-legged robot by means of the constraint function includes: first, generate an error function based on the target motion acceleration of the wheel-legged robot and the estimator of the target motion acceleration of the wheel-legged robot for each joint; then, determine a joint angular acceleration meeting the constraint function and making the error function obtain a minimum value as the target joint angular acceleration based on the error function and the constraint function; and finally, determine the joint torque based on the target joint angular acceleration.

The process is described in detail below:

(1) Generate an error function based on the target motion acceleration of the wheel-legged robot and the estimator of the target motion acceleration of the wheel-legged robot.

The error function is used for indicating: a difference between the target motion acceleration of the wheel-legged robot and the estimator of the target motion acceleration of the wheel-legged robot. The value of the error function indicates: a magnitude of the difference between the target motion acceleration of the wheel-legged robot and the estimator of the target motion acceleration of the wheel-legged robot.

In some embodiments, the difference between the target motion acceleration and the estimator of the target motion acceleration of the wheel-legged robot is used as an error function, and since the target motion acceleration of the wheel-legged robot is a function of the target joint angular acceleration reference value of the wheel-legged robot, the generated error function is also a function of the target joint angular acceleration reference value of the wheel-legged robot; or the target motion acceleration and the estimator of the target motion acceleration of the wheel-legged robot are substituted into preset equations or preset algorithms for computation to generate the error function. A method for generating the error function is not limited herein.

(2) Determine a joint angular acceleration meeting the constraint function and making the error function obtain a minimum value as the target joint angular acceleration based on the error function and the constraint function.

In some embodiments, the constraint function includes a joint angular acceleration parameter of the wheel-legged robot, or a preset function may further include a joint torque parameter associated with the joint angular acceleration parameter, etc. Moreover, as described above, the error function is also a function of the target joint angular acceleration reference value, at this time, the error function may have a minimum value by adjusting the value of the joint angular acceleration parameter of the robot and the values of other parameters associated with the joint angular acceleration parameter, and the value of the joint angular acceleration parameter meets the requirements of the constraint function. As a result, the target joint angular acceleration may be obtained, and the target joint angular acceleration may not only meet the posture control requirements of the base of the wheel-legged robot and the balance motion control requirements of the wheel-legged robot, but also conform to the kinematics equation and constraint conditions thereof of the wheel-legged robot, thereby effectively avoiding the problem of invalid or ineffective control in a case that only the motion acceleration of the wheel-legged robot is simply projected into the joint angular acceleration space. This problem is caused by the fact that the joint angular acceleration obviously exceeds the control range of a motor, or the obtained joint configuration posture of the wheel-legged robot obviously does not conform to the motion state of the wheel-legged robot.

(3) Determine the joint torque based on the target joint angular acceleration.

The processor of the wheel-legged robot substitutes the obtained target joint angular acceleration of the joint of the wheel-legged robot into a preset function to determine the joint torque of the joint, wherein the preset function is used for indicating a conversion relationship between the target joint angular acceleration and the joint torque.

In conclusion, according to the method for determining the joint torque of the wheel-legged robot in some embodiments, by determining the target motion acceleration and the estimator of the target motion acceleration of the wheel-legged robot, on the premise of meeting constraint conditions, the processor of the wheel-legged robot determines the joint torque of each joint of the wheel-legged robot, thereby providing a method for obtaining an optimal solution of a secondary optimization problem to determine the joint torque of each joint of the wheel-legged robot.

In some embodiments, the wheel-legged robot has a two-wheel (left and right wheel legs) configuration. A process of obtaining the target motion acceleration of the wheel leg of the wheel-legged robot is shown below.

First, in order to achieve the control of balance motion of the wheel-legged robot, by setting a relative acceleration $\ddot{x}_{wheel}^{base}$ of the base of the wheel-legged robot and the wheel leg of the wheel-legged robot, a relative displacement $x\_wheel\^base$ of the base and the wheel leg of the wheel-legged robot approaches 0, and at this time, a non-minimum phase system formed by the wheel leg and the base together is located on a balance point. Therefore, a following feedback control rate may be designed:

$$\ddot{x}_{wheel_{t+1}}^{base} = K_{p,1}(x_{wheel_{t+1}}^{base} - x_{wheel_t}^{base}) + K_{d,1}(0 - \dot{x}_{wheel_t}^{base}), \quad \text{Formula 16}$$

wherein $\ddot{x}_{wheel_{t+1}}^{base}$ represents a relative acceleration of the base of the wheel-legged robot and the wheel leg of the wheel-legged robot, $x_{wheel_{t+1}}^{base}$ represents a target horizontal distance between the mass center of the wheel leg and the mass center of the base of the wheel-legged robot, $x_{wheel_t}^{base}$ represents a current horizontal distance between the mass center of the wheel leg and the mass center of the base of the wheel-legged robot, the "0" here represents that the target relative velocity of the mass center of the wheel leg and the mass center of the base of the wheel-legged robot is 0, $\dot{x}_{wheel_t}^{base}$ represents a current relative velocity of the mass center of the wheel leg and the mass center of the base of the wheel-legged robot, and $K_{p,1}$ and $K_{d,1}$ represent parameters selected according to actual needs. It is to be understood that since the wheel-legged robot has the two-wheel configuration, the "wheel leg" here is a virtual single wheel obtained by fitting a left wheel leg and a right wheel leg, and the "mass center of the wheel leg" is a mass center of the virtual single wheel obtained by fitting the left wheel leg and the right wheel leg.

Based on formula 16, a relative acceleration $\ddot{x}_{wheel_{t+1}}^{base}$ of the wheel leg (virtual single wheel) relative to the base may be computed to achieve a control task. Further, it is considered that in the wheel-legged robot, the acceleration of the wheel leg (virtual single wheel) and the relative acceleration of the wheel leg (virtual single wheel) relative to the base need to meet the following relationship:

$$\ddot{x}_{wheel} = -\ddot{x}_{wheel}^{base} + \frac{x_{wheel}^{base}}{z_{wheel}^{base}}g, \quad \text{Formula 17}$$

wherein $\ddot{x}_{wheel}$ represents a motion acceleration of the wheel leg (virtual single wheel), $\ddot{x}_{wheel}^{base}$ represents a relative acceleration of the wheel leg (virtual single wheel) relative to the base, $x_{wheel}^{base}$ represents a distance between the base and the wheel leg (virtual single wheel) in a direction of an x coordinate axis (hereinafter referred to as an x direction), and $z_{wheel}^{base}$ represents a distance between the base and the wheel leg (virtual single wheel) in a direction of a z coordinate axis (hereinafter referred to as a z direction). A positive direction of the x coordinate axis is a forward direction of the wheel-legged robot, a positive direction of the z coordinate axis is a vertical upward direction, and g represents an acceleration of gravity.

When $\ddot{x}_{wheel}^{base}=0$, an outer loop controller may be designed to control a linear acceleration of the wheel leg (virtual single wheel), so as to control the motion of the wheel leg (virtual single wheel) in an x direction. A specific control rate is as follows:

$$\frac{x_{wheel_t}^{base}}{z_{wheel_t}^{base}}g = K_{p,2}(x_{wheel,t+1} - x_{wheel,t}) + K_{d,2}(\dot{x}_{wheel,t+1} - \dot{x}_{wheel,t}), \quad \text{Formula 18}$$

wherein $x_{wheel_t}^{base}$ represents a distance between the base and the wheel leg (virtual single wheel) in an x direction at the current time, which may be computed according to a feedback rate, $z_{wheel_t}^{base}$ represents a distance between the base and the wheel leg (virtual single wheel) in a z direction at the current time, g represents an acceleration of gravity, $x_{wheel,t+1}$ represents a target position of the wheel leg (virtual single wheel), $x_{wheel,t}$ represents a current position of the wheel leg (virtual single wheel), $\dot{x}_{wheel,t+1}$ represents a target velocity of the wheel leg (virtual single wheel), $\dot{x}_{wheel,t}$ represents a current velocity of the wheel leg (virtual single wheel), and $K_{p,2}$ and $K_{d,2}$ represent parameters selected according to actual needs.

Therefore, a feedback rate of a balance controller is finally obtained, and maximums of feedback coefficients $K_{p,1}$, $K_{p,2}$, $K_{d,1}$, $K_{d,2}$ may be designed and computed according to inner and outer loop systems respectively. For example, the feedback coefficients may be selected as: $K_{p,1}=1200$, $K_{d,1}=300$, $K_{p,2}=1$, $K_{d,2}=0.2$, and the following expression may be obtained:

Formula 19
$$\ddot{x}_{wheel,t+1} = -\left(K_{p,1}\left(x_{wheel_{t+1}}^{base} - x_{wheel_t}^{base}\right) + K_{d,1}\left(0 - \dot{x}_{wheel_t}^{base}\right)\right) + \frac{\ddot{x}_{wheel_t}^{base}}{z_{wheel_t}^{base}}g,$$

wherein $\ddot{x}_{wheel,t+1}$ represents a motion acceleration of the wheel leg (virtual single wheel) at a target time, $x_{wheel_{t+1}}^{base}$ represents an expected distance between the base and the wheel leg (virtual single wheel) in an x direction at the target time, which may be computed according to a feedback rate, $x_{wheel_t}^{base}$ represents a distance between the base and the wheel leg (virtual single wheel) in an x direction at the current time, and the meanings of other parameters are described above.

Then, a component x in a base operation matrix is canceled and replaced with linear accelerations of the left and right wheel legs, wherein the accelerations of the equivalent virtual single wheels of the left and right wheel legs have an impact on the balance, and the differential will affect a yaw angular acceleration of the wheel leg (virtual single wheel). Specifically, the yaw angular acceleration meets the following dynamics equation:

$$\ddot{\theta}_{yaw,wheel,t+1} = K_{p,3}(\theta_{yaw,wheel,t+1} - \theta_{yaw,wheel,t}) + K_{d,3}(0 - \dot{\theta}_{yaw,wheel,t}),$$ Formula 20:

wherein $\ddot{\theta}_{yaw,wheel,t+1}$ represents a target relative yaw angular acceleration, $\theta_{yaw,wheel,t+1}$ represents a target relative yaw angle, 0 represents that an expected relative yaw angular velocity (that is, a target relative yaw angular velocity) at a target time is 0, $\theta_{yaw,wheel,t}$ represents a current relative yaw angle, $\dot{\theta}_{yaw,wheel,t}$ represents a current relative yaw angular velocity, and $K_{p,3}$ and $K_{d,3}$ may be set according to actual needs, such as $K_{p,3}$=100, $K_{d,3}$=100.

In addition, according to the structural relationship between the wheel legs of two wheels, the following constraint formulae may further be obtained:

$$\ddot{x}_{wheel} = (\ddot{x}_{left} + \ddot{x}_{right})/2,$$ Formula 21

$$\ddot{\theta}_{yaw,wheel} = \frac{(\ddot{x}_{right} - \ddot{x}_{left})}{R_{width}},$$ Formula 22 wherein $\ddot{x}_{wheel}$ represents a motion acceleration of the wheel leg (virtual single wheel), $\ddot{x}_{left}$ represents a motion acceleration of the left wheel leg, $\ddot{x}_{right}$ represents a motion acceleration of the right wheel leg, $\ddot{\theta}_{yaw,wheel}$ represents a target relative yaw angular acceleration, and $R_{width}$ represents a relative distance between the left wheel leg and the right wheel leg in a direction perpendicular to a forward direction of the robot.

Further, expressions of linear accelerations of the left wheel leg and the right wheel leg may be obtained through the relationship between the linear acceleration and the angular acceleration, wherein the meanings of the parameters are described above:

$$\ddot{x}_{left,t+1} = \frac{\ddot{x}_{wheel,t+1} - \ddot{\theta}_{yaw,wheel,t+1}R_{width,t}}{2},$$ Formula 23

$$\ddot{x}_{right,t+1} = \frac{\ddot{x}_{wheel,t+1} + \ddot{\theta}_{yaw,wheel,t+1}R_{width,t}}{2},$$ Formula 24 wherein $\ddot{x}_{left,t+1}$ represents a target motion acceleration of the left wheel leg, $\ddot{x}_{right,t+1}$ represents a target motion acceleration of the right wheel leg, $\ddot{x}_{wheel,t+1}$ represents a target motion acceleration of the wheel leg (virtual single wheel), $\ddot{\theta}_{yaw,wheel,t+1}$ represents a target relative yaw angular acceleration of the wheel leg (virtual single wheel), and $R_{width,t}$ represents a relative distance between the left wheel leg and the right wheel leg in a direction perpendicular to a forward direction of the robot at the current time.

Therefore, the target acceleration of the left wheel leg and the target acceleration of the right wheel leg may be computed. By means of such settings, on the basis of achieving the balance control of the wheel-legged robot, the left and right wheel legs may further be controlled to have a relative distance in a direction of forward motion of the robot according to actual terrains and motion situations (for example, in the direction of forward motion, the left wheel leg is arranged in front of the right wheel leg).

In some embodiments, the wheel-legged robot is a two-wheel robot and has a parallel leg configuration, and a process of setting a constraint function of the wheel-legged robot is described more specifically below.

Figure 7:
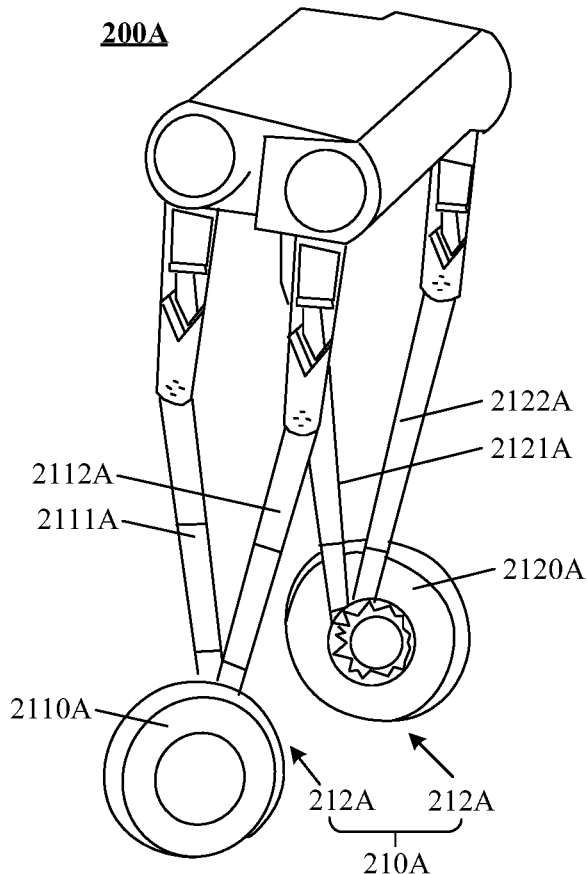
FIG. 7 is a three-dimensional schematic diagram of a wheel-legged robot according to some embodiments.

FIG. 7 shows a three-dimensional schematic diagram of a robot 200A according to some embodiments. Referring to FIG. 7, in some embodiments, a wheel leg 210A of the robot 200A includes a left wheel leg 211A and a right wheel leg 212A, each of the left wheel leg 211A and the right wheel leg 212A includes a single wheel, and each of the left wheel leg 211A and the right wheel leg 212A of the robot is further provided with two parallel legs connected to a central axis of the wheel and used for achieving the motion control of the wheel.

Referring to FIG. 7, the left wheel leg 211A includes, for example, a left wheel 2110A, and is further provided with parallel first left leg 2111A and second left leg 2112A for controlling the left wheel leg; and the right wheel leg 212A includes, for example, a right wheel 2120A, and is further provided with parallel first right leg 2121A and second right leg 2122A for controlling the right wheel leg.

In the process of setting the constraint function of the robot, first, the constraint relationship between the acceleration required for each sub-task (balance task of the wheel leg, roll task of the base) control and an actually inputted joint torque is established by establishing a dynamics model of the robot, the base of the wheel-legged robot is not fixedly connected with an inertial system, and there is a closed chain in kinematics.

Furthermore, assuming that the wheel and the ground have no sliding friction and only have pure rolling friction, there is a constraint that the acceleration of a contact point in an x direction (the x direction is a forward direction of the robot) and a z direction (the z direction is a vertical upward direction) under a local coordinate system is 0. By computing a Jacobian matrix $J_c$ of a velocity $v_1$ of the left and right wheel legs in the x and z directions under the local coordinate system relative to a generalized joint motion velocity $\dot{q}$, according to the acceleration constraint, the following formula may be obtained:

$$a_1 = \dot{v}_1 = J_c\ddot{q} + \dot{J}_c\dot{q} = 0,$$ Formula 25:

wherein $a_1$ represents an acceleration of the wheel leg, $v_1 = [v_{x,l}, v_{z,l}, v_{x,r}, v_{z,r}]$, $v_{x,l}$ represents a velocity of the left wheel leg in the x direction, $v_{z,l}$ represents a velocity of the left wheel leg in the z direction, $v_{x,r}$ represents a velocity of the right wheel leg in the x direction, $v_{z,r}$ represents a velocity of the right wheel leg in the z direction, q represents a joint position of each joint of the wheel-legged robot, $\dot{q}$ represents a joint velocity of each joint of the robot, $\ddot{q}$ represents a joint angular acceleration of each joint of the wheel-legged robot, $\ddot{q}$ includes a joint angular acceleration of the wheel leg and a joint angular acceleration of the base of the wheel-legged robot, $\ddot{q}$ indicates a value of the joint angular acceleration of the left and right wheel legs of the wheel-legged robot, which is the target joint angular acceleration reference value v of the target robot joint of the wheel-legged robot in formula 3, and $J_c$ represents a Jacobian matrix of a velocity $v_1$ of the left and right wheel legs in the x and z directions under the local coordinate system relative to a generalized joint motion velocity $\dot{q}$.

Furthermore, a contact point acceleration offset at a generalized joint angular acceleration $\ddot{q}=0$ may be computed:

$$J_c\dot{q}=f_a(q,\dot{q},0,\text{Contact}), \quad \text{Formula 26:}$$

wherein $f_a$ represents an acceleration function, Contact represents a parameter related to a contact process, and the meanings of other parameters are described above.

By a similar method, a closed chain constraint equation of the parallel legs under a generalized open chain coordinate system is denoted as:

$$a_2=\dot{v}_2=J_\lambda \ddot{q}+\dot{J}_\lambda \dot{q}=0, \quad \text{Formula 27:}$$

wherein $a_2$ represents an acceleration of the parallel legs, $v_2$ represents a velocity of the parallel legs, $J_\lambda$ represents a Jacobian matrix of a velocity $v_2$ of the parallel legs under the generalized open chain coordinate system relative to a generalized joint motion velocity $\dot{q}$, $\dot{q}$ represents a joint velocity of each joint of the robot, and $\ddot{q}$ represents a joint angular acceleration of each joint of the robot.

Moreover, the acceleration offset may further be computed by the following formula, wherein Close represents a parameter associated with the closed chain constraint of the parallel legs, and the meanings of other parameters are described above.

$$\dot{J}_\lambda \dot{q}=f_a(q,\dot{q},0,\text{Close}), \quad \text{Formula 28:}$$

Therefore, a dynamics equation and contact constraint formulae 29 to 32 without external force interference are obtained:

$$M\ddot{q}+C+G=S^T\tau+J_c^T F_c+J_\lambda^T F_\lambda, \quad \text{Formula 29:}$$

$$S=0, \quad \text{Formula 30:}$$

$$J_c\ddot{q}+\dot{J}_c\dot{q}=0, \quad \text{Formula 31:}$$

$$J_\lambda\ddot{q}+\dot{J}_\lambda\dot{q}=0, \quad \text{Formula 32:}$$

wherein known variables are M, C, G, S, $J_c$, $J_\lambda$, $\dot{J}_c\dot{q}$, $\dot{J}_\lambda\dot{q}$, specifically, a mass matrix M may be quickly computed based on a joint position q by a composite rigid body algorithm (CRBA), an offset term C of a centrifugal force and a Coriolis force may be quickly computed based on a joint position q and a joint velocity $\dot{q}$ by a Newton Euler iterative algorithm (RNEA), a gravity offset term G may also be quickly computed based on a joint position q by the RNEA, and a selection matrix S is used for distinguishing active joints from non-drive joints, which is denoted as S=diag(1, 1, 1, 1, $a_1$, $a_2$, . . . , $a_n$), wherein $a_i=1$ represents a non-drive joint, and the first four items correspond to joints of the base and may be directly set to 1 since the base has no drive.

Variables are $\ddot{q}$, $\tau$, $F_c$, $F_\lambda$, wherein $\ddot{q}$ represents a joint angular acceleration, $\tau$ represents a torque term corresponding to a joint, and $F_c$ represents a generalized force of a contact point under a local coordinate system. Specifically, $F_c=[f_{c,x,l}, f_{c,z,l}, f_{c,x,r}, f_{c,z,r}]\in R^4$, wherein $f_{c,x,l}$ represents a generalized force of the left wheel leg of the wheel-legged robot in an x direction, $f_{c,z,l}$ represents a generalized force of the left wheel leg of the wheel-legged robot in a z direction, $f_{c,x,r}$ represents a generalized force of the right wheel leg of the wheel-legged robot in an x direction, and $f_{c,z,r}$ represents a generalized force of the right wheel leg of the wheel-legged robot in a z direction. $F_\lambda$ represents a closed chain force exerted by a front leg on a rear leg, and $F_\lambda=[f_{\lambda,x,l}, f_{\lambda,z,l}, f_{\lambda,x,r}, f_{\lambda,z,r}]\in R^4$, wherein $f_{\lambda,x,l}$ represents a force exerted by the front leg in two parallel legs for the left wheel leg on the rear leg in an x direction, $f_{\lambda,z,l}$ represents a force exerted by the front leg in two parallel legs for the left wheel leg on the rear leg in a z direction, $f_{\lambda,x,r}$ represents a force exerted by the front leg in two parallel legs for the right wheel leg on the rear leg in an x direction, and $f_{\lambda,z,r}$ represents a force exerted by the front leg in two parallel legs for the right wheel leg on the rear leg in a z direction.

The above equality constraints may be obtained by a complete dynamics method, and according to the friction cone limit, the constraints that a contact force $F_c$ needs to meet under a local system (a tangent direction of a friction curved surface) may be obtained:

$$f_{c,x,l}\in[-\mu f_{c,z,l}, \mu f_{c,z,l}], f_{c,z,l}\geq 0, \quad \text{Formula 33:}$$

$$f_{c,x,r}\in[-\mu f_{c,z,r}, \mu f_{c,z,r}], f_{c,z,r}\geq 0, \quad \text{Formula 34:}$$

wherein $f_{c,x,l}$ represents a generalized force of the left wheel leg of the wheel-legged robot in an x direction, $\mu$ represents a friction factor under the current ambient environment, $f_{c,z,l}$ represents a generalized force of the left wheel leg of the wheel-legged robot in a z direction, $f_{c,x,r}$ represents a generalized force of the right wheel leg of the wheel-legged robot in an x direction, and $f_{c,z,r}$ represents a generalized force of the right wheel leg of the wheel-legged robot in a z direction.

Furthermore, the following friction cone constraint matrices may be obtained:

$$J_{f,l}=\begin{bmatrix} 1 & \mu \\ -1 & \mu \\ 0 & 1 \end{bmatrix}, J_{f,r}=\begin{bmatrix} 1 & \mu \\ -1 & \mu \\ 0 & 1 \end{bmatrix}, \quad \text{Formula 35}$$

wherein $J_{f,l}$ represents a friction constraint matrix corresponding to a left wheel contact point of the wheel-legged robot, $J_{f,r}$ represents a friction constraint matrix corresponding to a right wheel contact point of the wheel-legged robot, and $\mu$ represents a friction factor under the current ambient environment.

Accordingly, an equality constraint subfunction, an inequality constraint subfunction and a threshold constraint subfunction of the constraint function are obtained.

The equality constraint subfunction includes:

$$\begin{bmatrix} M_t & -J_{c,t}^T & -J_{\lambda,t}^T & -I \\ 0 & 0 & 0 & S \\ J_{c,t} & 0 & 0 & 0 \\ J_{\lambda,t} & 0 & 0 & 0 \end{bmatrix}\begin{bmatrix} \ddot{q}_{t+1} \\ F_{c,t+1} \\ F_{\lambda,t+1} \\ \tau_{t+1} \end{bmatrix}=\begin{bmatrix} -C_t-G_t \\ 0 \\ -\dot{J}_{c,t}\dot{q}_t \\ \dot{J}_{\lambda,t}\dot{q}_t \end{bmatrix}, \quad \text{Formula 36}$$

wherein $\ddot{q}_{t+1}$ represents a joint angular acceleration of the wheel-legged robot at the target time, $\dot{q}_t$ represents a current joint velocity of the wheel-legged robot, $F_{c,t+1}$ represents a generalized force of a contact point of the wheel-legged robot under a local coordinate system at the target time, $F_{\lambda,t+1}$ represents an acting force between the two parallel legs at the target time, $\tau_{t+1}$ represents a joint torque of the wheel-legged robot at the target time, and $J_{c,t}$ and $J_{\lambda,t}$ represent Jacobian matrices corresponding to the generalized force Fc of the contact point of the wheel-legged robot under the local coordinate system and the acting force $F_\lambda$ between the two parallel legs respectively at the current time, and are generated according to the current motion state data of the wheel-legged robot; $C_t$, $G_t$ and $M_t$ represent parameters generated based on the current joint motion state data of the wheel-legged robot; and S represents a parameter determined based on a joint configuration of the wheel-legged robot, I represents a unit matrix of which the dimension is determined according to the number of degrees of freedom of motion of the wheel-legged robot, t represents the current time of motion of the wheel-legged robot, and t+1 represents the target time of motion of the wheel-legged robot.

The joint inequality constraint subfunction includes:

$$\begin{bmatrix} J_{f,l} & 0 \\ 0 & J_{f,r} \end{bmatrix} F_{c,t+1} \geq 0, \qquad \text{Formula 37}$$

wherein $J_{f,l}$ represents a friction constraint matrix corresponding to a left wheel contact point of the wheel-legged robot, and $J_{f,r}$ represents a friction constraint matrix corresponding to a right wheel contact point of the wheel-legged robot. The friction cone constraint matrix may be specifically expressed as:

$$J_{f,l} = \begin{bmatrix} 1 & \mu \\ -1 & \mu \\ 0 & 1 \end{bmatrix}, J_{f,r} = \begin{bmatrix} 1 & \mu \\ -1 & \mu \\ 0 & 1 \end{bmatrix}. \qquad \text{Formula 38}$$

The joint threshold constraint subfunction includes:

$$\tau_{t+1} \in [\tau_{min}, \tau_{max}]. \qquad \text{Formula 39}$$

In the above equality and inequality constraints, variables $\ddot{q}_{t+1}$, $F_{c,t+1} F_{\lambda,t+1}$, $\tau_{t+1}$ are related to each other to a certain extent. When an input torque is known, that is, $\tau_{t+1}$ is known, and inequality constraints do not exist, the least square solution of $\ddot{q}_{t+1}$, $F_{c,t+1} F_{\lambda,t+1}$ may be obtained.

$$\begin{bmatrix} M_t & -J_{c,t}^T & -J_{\lambda,t}^T & -I \\ 0 & 0 & 0 & S \\ J_{c,t} & 0 & 0 & 0 \\ J_{\lambda,t} & 0 & 0 & 0 \end{bmatrix} \begin{bmatrix} \ddot{q}_{t+1} \\ F_{c,t+1} \\ F_{\lambda,t+1} \\ \tau_{t+1} \end{bmatrix} = \begin{bmatrix} -C_t - G_t \\ 0 \\ -\dot{J}_{c,t} \dot{q}_t \\ \dot{J}_{\lambda,t} \dot{q}_t \end{bmatrix}. \qquad \text{Formula 40}$$

It can be seen that although $$\begin{bmatrix} \ddot{q}_{t+1} \\ F_{c,t+1} \\ F_{\lambda,t+1} \end{bmatrix}$$

belongs to a high-dimension space, there is a one-to-one mapping relationship between it and a joint torque sub-space with a dimension of k (k is much smaller than the dimension of the high-dimension space), that is, due to the existence of equality and inequality constraints, $$\begin{bmatrix} \ddot{q}_{t+1} \\ F_{c,t+1} \\ F_{\lambda,t+1} \end{bmatrix}$$

actually belongs to a low-dimension boundary manifold meeting equality constraints in the high-dimension space. The $\tau$ value corresponding to the torque sub-space may be obtained by reasonably selecting the acceleration or force $F_c$ of the sub-space.

Furthermore, through Jacobian matrices, a linear mapping relationship between an operating space acceleration and a generalized joint space acceleration can be defined, and the operating space acceleration consistent with a low-dimension manifold degree of freedom may be found, so as to find a corresponding joint torque input meeting dynamics constraints, thereby achieving the control of the operating space in a low-dimension manifold (the new control requirements of the robot do not destroy equality and inequality constraints).

Furthermore, the selection of the operating space needs to ensure that a Jacobian matrix $J_{task}$ of the final total task meets $\text{rank}(J_{task}) \geq k$ (k represents a dimension of a joint space). If $\text{rank}(J_{task}) < k$, it means that there is an uncontrolled sub-space which will cause a dynamics system to diverge. When $\text{rank}(J_{task}) > k$, it means that there may be task requirements that break the constraint conditions. When $\text{rank}(J_{task}) = k$, a final criterion may be obtained.

Based on the above, in a case of meeting the above dynamics equations and frictional constraints, the corresponding relationship between the operating space of the wheel-legged robot (in which robot motion control is performed) and the joint motion space of the wheel-legged robot (in which each joint of the wheel-legged robot performs a corresponding joint motion) may be determined. As a result, the target motion acceleration of the wheel-legged robot, determined based on the target motion acceleration of the wheel leg and the target motion acceleration of the base in the operating space of the wheel-legged robot, may be converted into the joint motion space of the wheel-legged robot through the corresponding relationship. Similarly, the target motion acceleration of the wheel-legged robot may also be expressed by the joint angular acceleration of the wheel-legged robot in the joint motion space.

Figure 8:
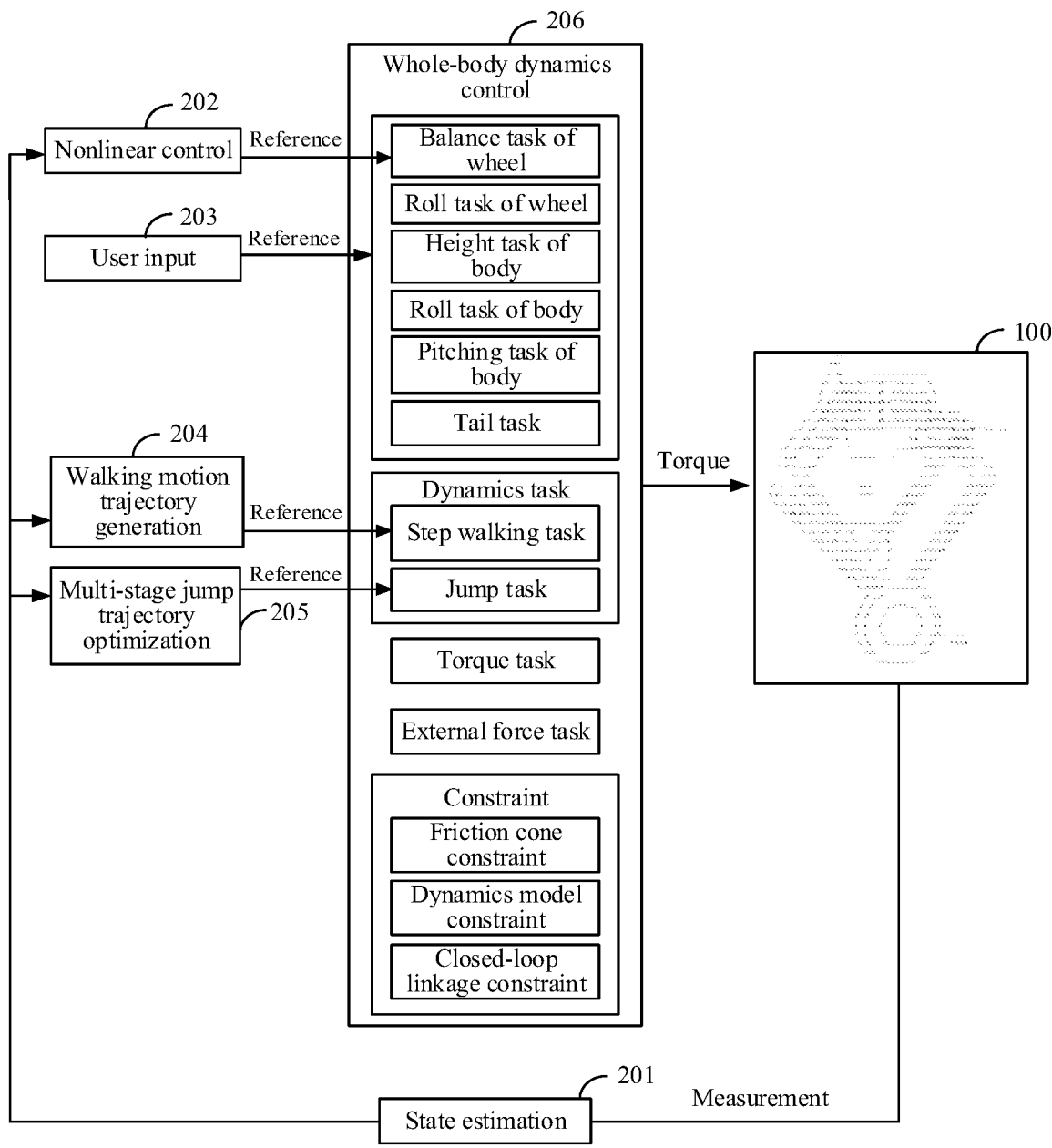
FIG. 8 is a schematic diagram of a structure for controlling a wheel-legged robot according to some embodiments.

FIG. 8 is a schematic diagram of a control frame of a wheel-legged robot according to some embodiments.

In some embodiments, the motion state data of the wheel-legged robot 100 is collected. The motion state data includes a pitch angle and an angular velocity thereof of the base, an angle and an angular velocity of the joint, etc. The motion state data is sent to a state estimation module 201, and the state estimation module 201 is configured to estimate the internal state of the system through the motion state data. The output of the state estimation module 201 is the input of a nonlinear controller 202, a walking motion trajectory generator 204 and a multi-stage jump trajectory optimizer 205.

In some embodiments, the nonlinear controller 202 is configured to perform nonlinear control of the wheel-legged robot to obtain a target joint angular acceleration reference value of a target robot joint of the wheel-legged robot. The joint angular acceleration may be used as a reference input of a balance task of a wheel in a whole-body dynamics controller 206.

In some embodiments, a user input module 203, the walking motion trajectory generator 204 and the multi-stage jump trajectory optimizer 205 may be configured to obtain action reference trajectories of the wheel-legged robot. An action reference trajectory obtained through the user input module 203 may be used as a reference input of a balance task of the wheel leg, a roll task of the wheel, a height task of the base, a roll task of the base, a pitching task of the base and a tail task in the whole-body dynamics controller 206; an action reference trajectory obtained through the walking motion trajectory generator 204 may be used as a reference input of a step walking task in the whole-body dynamics controller 206; and an action reference trajectory obtained through the multi-stage jump trajectory optimizer 205 may be used as a reference input of a jump task in the whole-body dynamics controller 206.

In some embodiments, by obtaining the target joint angular acceleration reference value and the action reference trajectory of the target robot joint of the wheel-legged robot, the whole-body dynamics controller 206 computes joint torques for controlling the wheel-legged robot to perform a control task. The joint torques include torques of all joint motors of the wheel-legged robot. The torque outputted by the whole-body dynamics controller 206 is used as an input of the wheel-legged robot 100 to instruct the wheel-legged robot 100 to complete the control task.

Figure 9:
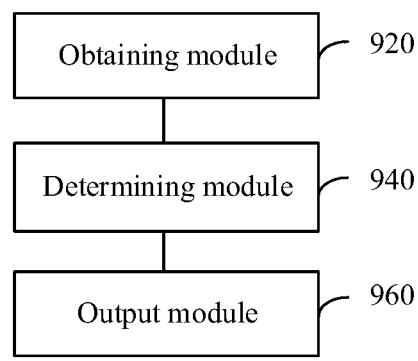
FIG. 9 is a structural block diagram of an apparatus for controlling a wheel-legged robot according to some embodiments.

FIG. 9 is a structural block diagram of an apparatus for controlling a wheel-legged robot according to some embodiments. As shown in FIG. 9, the apparatus includes:

an obtaining module 920 configured to obtain current motion state data of the wheel-legged robot, the current motion state data being used for representing motion features of the wheel-legged robot;

a determining module 940 configured to input the current motion state data into a nonlinear controller to obtain a target joint angular acceleration reference value of a target robot joint of the wheel-legged robot; and an output module 960 configured to input the target joint angular acceleration reference value into a whole-body dynamics controller to output a joint torque for controlling the wheel-legged robot to perform a control task.

In some embodiments, the nonlinear controller is obtained by the following operations: determine an original energy relationship of the wheel-legged robot, the original energy relationship including an original potential energy, and the original potential energy having an unsteady property; determine a variable energy relationship of the wheel-legged robot, the variable energy relationship including a variable potential energy, the variable potential energy having a steady property, and the value of the variable potential energy being minimum in a case that the wheel-legged robot is in a target balance state; and determine the nonlinear controller with the goal of changing the original energy relationship into the variable energy relationship.

In some embodiments, the nonlinear controller includes: $v=A_1(\theta)p(x-x^*)+p^T A_2(\theta)p+A_3(\theta)-k_v A_4(\theta)p$, wherein v represents a target joint angular acceleration reference value of the target robot joint, x represents a rotation distance of a wheel leg of the wheel-legged robot, $\dot{x}$ represents a rotation linear velocity of the wheel leg of the wheel-legged robot, $x^*$ represents a balance point of the wheel leg in the target balance state, $p=[\dot{\theta}\dot{x}]^T$, $\theta$ represents an inclination angle of the wheel-legged robot, $\dot{\theta}$ represents an inclination angular velocity of the wheel-legged robot, $k_v$ represents a free parameter during damping injection, and $A_1, A_2, A_3$, and $A_4$ represent preset parameters.

In some embodiments, the nonlinear controller includes: $v=\bar{p}^T A_2(\theta)\bar{p}+A_3(\theta)-k_v A_4(\theta)\bar{p}$, wherein v represents a target joint angular acceleration reference value of the target robot joint, $\bar{p}=[\dot{\theta}\dot{x}-\dot{x}^*]^T$, $\dot{x}$ represents a rotation linear velocity of a wheel leg of the wheel-legged robot, $\dot{x}^*$ represents a rotation acceleration of the wheel leg of the wheel-legged robot in the target balance state, $\theta$ represents an inclination angle of the wheel-legged robot, $\dot{\theta}$ represents an inclination angular velocity of the wheel-legged robot, $k_v$ represents a free parameter during damping injection, and $A_2, A_3$, and $A_4$ represent preset parameters.

In some embodiments, the output module 960 is configured to solve a secondary optimization problem with the control goal of the target joint angular acceleration reference value by the whole-body dynamics controller on the premise of meeting constraint conditions, so as to obtain a joint torque for controlling the wheel-legged robot to perform the self-balance task.

In some embodiments, the output module 960 is configured to compute a target posture angular acceleration reference value of the base with the goal of maintaining relative balance based on the target joint angular acceleration reference value of the wheel leg; and determine a joint torque of each joint in a case that the wheel-legged robot performs the self-balance task according to the target joint angular acceleration reference value of the wheel leg and the target posture angular acceleration reference value of the base by the whole-body dynamics controller on the premise of meeting the constraint conditions. In some embodiments, the obtaining module 920 is further configured to obtain an action reference trajectory of the action task; and the output module 960 is configured to input the target joint angular acceleration reference value and the action reference trajectory into the whole-body dynamics controller to output a joint torque for controlling the wheel-legged robot to perform the action task.

In some embodiments, the output module 960 is configured to solve a secondary optimization problem with the control goal of the target joint angular acceleration reference value and the action reference trajectory by the whole-body dynamics controller on the premise of meeting constraint conditions, so as to obtain a joint torque for controlling the wheel-legged robot to perform the action task.

In some embodiments, the output module 960 is configured to compute a target posture angular acceleration reference value of the base with the goal of the action reference trajectory based on the target joint angular acceleration reference value of the wheel leg; and determine a joint torque of each joint in a case that the wheel-legged robot performs the action task according to the target joint angular acceleration reference value of the wheel leg and the target posture angular acceleration reference value of the base by the whole-body dynamics controller on the premise of meeting the constraint conditions.

In some embodiments, the obtaining module 920 is further configured to receive a user control input from a remote controller; and determine an action reference trajectory of the action task based on the user control input.

In some embodiments, the wheel-legged robot includes a wheel leg and a base, and the action task includes at least one of the following: a roll task of a wheel of the wheel-legged robot; a height task of the base of the wheel-legged robot; and a balance task of the wheel leg.

In some embodiments, the obtaining module 920 is further configured to input the current motion state data into a trajectory generator of the action task to obtain an action reference trajectory of the action task.

In some embodiments, the obtaining module 920 is further configured to input the current motion state data into a walking motion trajectory generator to obtain an action reference trajectory for controlling the wheel-legged robot to perform a two-wheel alternating step walking task.

In some embodiments, the obtaining module 920 is further configured to input the current motion state data into a jump trajectory generator to obtain an action reference trajectory for controlling the wheel-legged robot to perform a jump task.

In some embodiments, the constraint conditions include: at least two of a friction cone constraint, a closed-loop linkage constraint and a dynamics constraint, wherein the friction cone constraint is used for constraining a reacting force of a bearing surface to meet a friction cone, and the reacting force of the bearing surface refers to an acting force of the bearing surface on the wheel-legged robot; the closed-loop linkage constraint is used for constraining a leg linkage structure of the wheel-legged robot; and the dynamics constraint is used for constraining the control task based on a dynamics model of the wheel-legged robot.

In some embodiments, in a case that wheels of the wheel-legged robot are in contact with the ground, the constraint conditions include: a friction cone constraint, a closed-loop linkage constraint and a dynamics constraint; and in a case that wheels of the wheel-legged robot are not in contact with the ground, the constraint conditions include: the closed-loop linkage constraint and the dynamics constraint.

In some embodiments, the obtaining module 920 is configured to obtain sensor data of the wheel-legged robot; and estimate a motion state of the wheel-legged robot based on the sensor data to obtain the current motion state data, wherein the sensor data includes at least one of a left wheel angle and a left wheel angular velocity of the wheel-legged robot, at least one of a right wheel angle and a right wheel angular velocity of the wheel-legged robot, a pitch angle and an angular velocity thereof of the base, a roll angle and an angular velocity thereof of the base, a yaw angle and an angular velocity thereof of the base, and at least one of an angle and an angular velocity of a joint motor of the wheel-legged robot.

Figure 10:
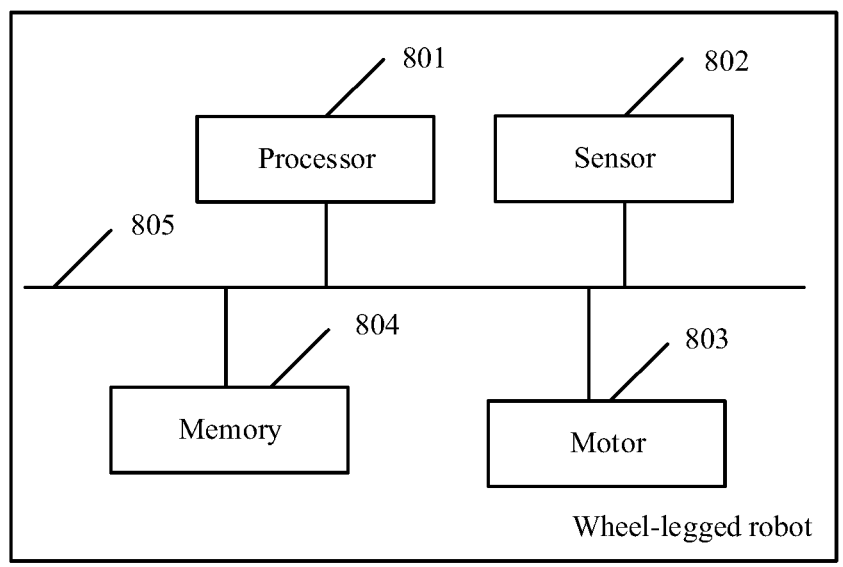
FIG. 10 is a structural block diagram of a wheel-legged robot according to some embodiments.

FIG. 10 shows a schematic structural block diagram of a wheel-legged robot provided by some embodiments. The wheel-legged robot in some embodiments as shown in FIG. 10 may include: one or more processors 801, one or more sensors 802, one or more motors 803, and a memory 804. The processor 801, the sensor 802, the motor 803 and the memory 804 are connected by a bus 805. The memory 804 is configured to store a computer program. The computer program includes program instructions. The processor 801 is configured to execute the program instructions stored in the memory 804.

The memory 804 may include a volatile memory, such as a RAM (Random-Access Memory). The memory 804 may also include a non-volatile memory, such as a flash memory, and a solid-state drive (SSD). The memory 804 may, in some embodiments, include a combination of the foregoing types of memories.

The processor 801 may be a central processing unit (Central Processing Unit, CPU). The processor 801 may further include a hardware chip. The foregoing hardware chip may be an application-specific integrated circuit (ASIC), a programmable logic device (PLD), or the like. The PLD may be a field programmable gate array (FPGA), generic array logic (GAL), or the like. The processor 801 may, in some embodiments, be a combination of the foregoing structures.

In some embodiments, the memory 804 is configured to store computer programs, the computer programs include program instructions, and the processor 801 is configured to execute the program instructions stored in the memory 804 to implement the operations of the above corresponding methods in FIG. 3 to FIG. 5.

In some embodiments, the processor 801 is configured to invoke program instructions to:

input the current motion state data into a nonlinear controller to obtain a target joint angular acceleration reference value of a target robot joint of the wheel-legged robot; and input the target joint angular acceleration reference value of the target robot joint of the wheel-legged robot into a whole-body dynamics controller to output a joint torque for controlling the wheel-legged robot to perform a control task.

In some embodiments, a nonlinear system controller includes: a partial feedback linear controller and a nonlinear controller based on a simplified model; and the processor 801 is configured to invoke program instructions to:

determine an original energy relationship of the wheel-legged robot, the original energy relationship including an original potential energy, and the original potential energy having an unsteady property;

determine a variable energy relationship of the wheel-legged robot, the variable energy relationship including a variable potential energy, the variable potential energy having a steady property, and the value of the variable potential energy being minimum in a case that the wheel-legged robot is in a target balance state; and determine the nonlinear controller with the goal of changing the original energy relationship into the variable energy relationship.

In some embodiments, a control operation includes a touch operation of a game user for a user interface; and the processor 801 is configured to invoke program instructions to:

solve a secondary optimization problem with the control goal of the target joint angular acceleration reference value by the whole-body dynamics controller on the premise of meeting constraint conditions, so as to obtain a joint torque for controlling the wheel-legged robot to perform the self-balance task.

In some embodiments, the processor 801 is configured to invoke program instructions to:

compute a target posture angular acceleration reference value of the base with the goal of maintaining relative balance based on the target joint angular acceleration reference value of the wheel leg; and determine a joint torque of each joint in a case that the wheel-legged robot performs the self-balance task according to the target joint angular acceleration reference value of the wheel leg and the target posture angular acceleration reference value of the base by the whole-body dynamics controller on the premise of meeting the constraint conditions.

In some embodiments, the processor 801 is configured to invoke program instructions to:

input the target joint angular acceleration reference value and the action reference trajectory into the whole-body dynamics controller to output a joint torque for controlling the wheel-legged robot to perform the action task. In some embodiments, the processor 801 is configured to invoke program instructions to:

solve a secondary optimization problem with the control goal of the target joint angular acceleration reference value and the action reference trajectory by the whole-body dynamics controller on the premise of meeting constraint conditions, so as to obtain a joint torque for controlling the wheel-legged robot to perform the action task. In some embodiments, the processor 801 is configured to invoke program instructions to:

compute a target posture angular acceleration reference value of the base with the goal of the action reference trajectory based on the target joint angular acceleration reference value of the wheel leg; and determine a joint torque of each joint in a case that the wheel-legged robot performs the action task according to the target joint angular acceleration reference value of the wheel leg and the target posture angular acceleration reference value of the base by the whole-body dynamics controller on the premise of meeting the constraint conditions.

In some embodiments, the processor 801 is configured to invoke program instructions to:

input the current motion state data into a trajectory generator of the action task to obtain an action reference trajectory of the action task.

In some embodiments, the processor 801 is configured to invoke program instructions to:

input the current motion state data into a walking motion trajectory generator to obtain an action reference trajectory for controlling the wheel-legged robot to perform a two-wheel alternating step walking task.

In some embodiments, the processor 801 is configured to invoke program instructions to:

input the current motion state data into a jump trajectory generator to obtain an action reference trajectory for controlling the wheel-legged robot to perform a jump task.

The sensor 802 is configured to obtain motion state data of the wheel-legged robot, and the motion state data includes: a left wheel velocity of the wheel-legged robot, a right wheel velocity of the wheel-legged robot, a pitch angle and an angular velocity thereof of the base of the wheel-legged robot, a roll angle and an angular velocity thereof of the base of the wheel-legged robot, a yaw angle and an angular velocity thereof of the base of the wheel-legged robot, and at least one of an angle and an angular velocity of a joint motor of the wheel-legged robot.

The motor 803 is configured to control the motion of the wheel-legged robot and complete action tasks. The motor 803 includes all joint motors and wheel motors of the wheel-legged robot.

Some embodiments further provide a wheel-legged robot. The wheel-legged robot includes a processor and a memory. At least one segment of program is stored in the memory, and the at least one segment of program is loaded and executed by the processor to implement the method for controlling a wheel-legged robot provided in each of the above method embodiments.

Some embodiments further provide a computer device, including a processor and a memory, the memory storing at least one program, the at least one program being loaded and executed by the processor to implement the method for controlling the wheel-legged robot described in the foregoing method embodiments.

Some embodiments further provide a computer-readable storage medium, storing at least one program, the at least one program being loaded and executed by the processor to implement the method for controlling the wheel-legged robot provided in the foregoing method embodiments.

In some embodiments, the computer-readable storage medium may include: a ROM, a RAM, a solid state drive (SSD), an optical disc, or the like. The RAM may include a resistive RAM (ReRAM) and a dynamic RAM (DRAM).

The sequence numbers of some embodiments are merely for description purpose, and do not indicate the preference among the embodiments.

Those of ordinary skill in the art may understand that all or part of the operations of implementing the foregoing embodiments may be implemented by hardware, or may be implemented by a program instructing related hardware. The program may be stored in a computer-readable storage medium. The storage medium mentioned may be a read-only memory, a magnetic disk or an optical disc. The foregoing descriptions are not intended to limit this disclosure. Any modification, equivalent replacement, or improvement made within the spirit and principle of the disclosure shall fall within the protection scope of the disclosure.

Some embodiments further provide a chip, including a programmable logic circuit or a program, the chip being configured to implement the method for controlling the wheel-legged robot provided in the foregoing method embodiments.

Some embodiments further provide a computer program product, the computer program product including computer instructions, the computer instructions being stored in a computer-readable storage medium. A processor of a computer device reads the computer instructions from the computer-readable storage medium and executes the computer instructions to cause the computer device to perform the method for controlling the wheel-legged robot described in any one of the foregoing embodiments.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A method for controlling a wheel-legged robot, performed by at least one processor, the method comprising:
    obtaining current motion state data of the wheel-legged robot, the current motion state data representing motion features of the wheel-legged robot;
    inputting the current motion state data into a nonlinear controller to obtain a target joint angular acceleration reference value of a target robot joint of the wheel-legged robot; and
    inputting the target joint angular acceleration reference value into a whole-body dynamics controller to output a joint torque for controlling the wheel-legged robot to perform a control task.

2. The method according to claim 1, wherein the nonlinear controller is obtained by the following operations:
    determining an original energy relationship of the wheel-legged robot, the original energy relationship comprising an original potential energy, and the original potential energy having an unsteady property;
    determining a variable energy relationship of the wheel-legged robot, the variable energy relationship comprising a variable potential energy having a steady property, and a value of the variable potential energy being minimum when the wheel-legged robot is in a target balance state; and determining the nonlinear controller to change the original energy relationship into the variable energy relationship.

3. The method according to claim 2, wherein the inputting the current motion state data into the nonlinear controller comprises:
substituting the current motion state data into the nonlinear controller shown in the following formula to compute the target joint angular acceleration reference value of the target robot joint of the wheel-legged robot:

$$v=A_1(\theta)p(x-x^*)+p^T A_2(\theta)p+A_3(\theta)-k_v A_4(\theta)p,$$

wherein v represents the target joint angular acceleration reference value of the target robot joint, x represents a rotation distance of a wheel leg of the wheel-legged robot, $\dot{x}$ represents a rotation linear velocity of the wheel leg of the wheel-legged robot, x* represents a balance point of the wheel leg in the target balance state, $p=[\dot{\theta}\dot{x}]^T$, $\theta$ represents an inclination angle of the wheel-legged robot, $\dot{\theta}$ represents an inclination angular velocity of the wheel-legged robot, $k_v$ represents a free parameter during damping injection, and $A_1$, $A_2$, $A_3$, and $A_4$ represent preset parameter computation expressions.

4. The method according to claim 2, wherein the inputting the current motion state data into the nonlinear controller comprises:
substituting the current motion state data into the nonlinear controller shown in the following formula to compute the target joint angular acceleration reference value of the target robot joint of the wheel-legged robot:

$$v=\bar{p}^T A_2(\theta)\bar{p}+A_3(\theta)-k_v A_4(\theta)\bar{p},$$

wherein v represents the target joint angular acceleration reference value of the target robot joint, $\bar{p}=[\dot{\theta}\dot{x}-\ddot{x}^*]^T$, $\dot{x}$ represents a rotation linear velocity of a wheel leg of the wheel-legged robot, $\ddot{x}$ represents a rotation acceleration of the wheel leg of the wheel-legged robot in the target balance state, $\theta$ represents an inclination angle of the wheel-legged robot, $\dot{\theta}$ represents an inclination angular velocity of the wheel-legged robot, $k_v$ represents a free parameter during damping injection, and $A_2$, $A_3$, and $A_4$ represent preset parameter computation expressions.

5. The method according to claim 1, wherein the control task comprises a self-balance task; and
the inputting the target joint angular acceleration reference value into the whole-body dynamics controller comprises:
solving a secondary optimization problem to control the target joint angular acceleration reference value based on meeting constraint conditions, so as to obtain the joint torque for controlling the wheel-legged robot to perform the self-balance task.

6. The method according to claim 5, wherein:
the wheel-legged robot comprises a wheel leg and a base;
the target joint angular acceleration reference value of the target robot joint comprises a target angular acceleration reference value of the wheel leg; and
the solving the secondary optimization problem comprises:
computing a target posture angular acceleration reference value of the base to maintain relative balance of the wheel-legged robot based on the target joint angular acceleration reference value of the wheel leg; and
determining the joint torque of each joint when the wheel-legged robot performs the self-balance task based on the target joint angular acceleration reference value of the wheel leg and the target posture angular acceleration reference value of the base meeting the constraint conditions.

7. The method according to claim 5, wherein the constraint conditions comprise at least two of a friction cone constraint, a closed-loop linkage constraint and a dynamics constraint,
wherein the friction cone constraint constrains a reacting force of a bearing surface to meet a friction cone, and the reacting force of the bearing surface being an acting force of the bearing surface on the wheel-legged robot,
wherein the closed-loop linkage constraint constrains a leg linkage structure of the wheel-legged robot, and
wherein the dynamics constraint constrains the control task based on a dynamics model of the wheel-legged robot.

8. The method according to claim 7, wherein
when wheels of the wheel-legged robot are in contact with a ground, the constraint conditions comprise: the friction cone constraint, the closed-loop linkage constraint and the dynamics constraint; and
when the wheels of the wheel-legged robot are not in contact with the ground, the constraint conditions comprise: the closed-loop linkage constraint and the dynamics constraint.

9. The method according to claim 1, wherein:
the control task comprises an action task;
the method further comprises obtaining an action reference trajectory of the action task; and
the inputting the target joint angular acceleration reference value comprises inputting the target joint angular acceleration reference value and the action reference trajectory into the whole-body dynamics controller to output the joint torque for controlling the wheel-legged robot to perform the action task.

10. The method according to claim 9, wherein the inputting the target joint angular acceleration reference value and the action reference trajectory into the whole-body dynamics controller comprises:
solving a secondary optimization problem to control the target joint angular acceleration reference value and the action reference trajectory based on meeting constraint conditions, so as to obtain the joint torque for controlling the wheel-legged robot to perform the action task.

11. The method according to claim 10, wherein:
the wheel-legged robot comprises a wheel leg and a base;
the target joint angular acceleration reference value of the target robot joint comprises a target angular acceleration value of the wheel leg; and
the solving the secondary optimization problem comprises:
computing a target posture angular acceleration reference value of the base to determine the action reference trajectory based on the target joint angular acceleration reference value of the wheel leg; and
determining the joint torque of each joint when the wheel-legged robot performs the action task based on the target joint angular acceleration reference value of the wheel leg and the target posture angular acceleration reference value of the base meeting the constraint conditions.

12. The method according to claim 10, wherein the constraint conditions comprise at least two of a friction cone constraint, a closed-loop linkage constraint and a dynamics constraint,
wherein the friction cone constraint constrains a reacting force of a bearing surface to meet a friction cone, and the reacting force of the bearing surface being an acting force of the bearing surface on the wheel-legged robot;
wherein the closed-loop linkage constraint constrains a leg linkage structure of the wheel-legged robot; and
wherein the dynamics constraint constrains the control task based on a dynamics model of the wheel-legged robot.

13. The method according to claim 9, wherein the obtaining the action reference trajectory of the action task comprises:
receiving a user control input from a remote controller; and
determining the action reference trajectory of the action task based on the user control input.

14. The method according to claim 9, wherein the wheel-legged robot comprises a wheel leg and a base, and the action task comprises at least one of:
a roll task of the wheel leg;
a height task of the base;
a roll task of the base;
a pitching task of the base;
a yaw task of the base;
a tail control task of the base; and
a balance task of the wheel leg.

15. The method according to claim 9, wherein the obtaining the action reference trajectory of the action task comprises:
inputting the current motion state data into a trajectory generator of the action task to obtain the action reference trajectory of the action task.

16. The method according to claim 15, wherein:
the trajectory generator comprises a walking motion trajectory generator; and
the inputting the current motion state data into the trajectory generator comprises inputting the current motion state data into the walking motion trajectory generator to obtain the action reference trajectory for controlling the wheel-legged robot to perform a two-wheel alternating step walking task.

17. The method according to claim 15, wherein:
the trajectory generator comprises a jump trajectory generator; and
the inputting the current motion state data into the trajectory generator comprises:
inputting the current motion state data into the jump trajectory generator to obtain the action reference trajectory for controlling the wheel-legged robot to perform a jump task.

18. The method according to claim 1, wherein:
the wheel-legged robot comprises a wheel leg and a base, the wheel leg comprises a left wheel and a right wheel, the obtaining the current motion state data of the wheel-legged robot comprises:
obtaining sensor data of the wheel-legged robot; and
estimating a motion state of the wheel-legged robot based on the sensor data to obtain the current motion state data, and
wherein the sensor data comprises at least one of a left wheel angle and a left wheel angular velocity of the wheel-legged robot, at least one of a right wheel angle and a right wheel angular velocity of the wheel-legged robot, a pitch angle and an angular velocity thereof of the base, a roll angle and the angular velocity thereof of the base, a yaw angle and the angular velocity thereof of the base, and at least one of an angle and the angular velocity of a joint motor of the wheel-legged robot.

19. An apparatus for controlling a wheel-legged robot comprising:
at least one memory configured to store program code; and
at least one processor configured to read the program code and operate as instructed by the program code, the program code comprising:
obtaining code configured to cause at least one of the at least one processor to obtain current motion state data of the wheel-legged robot, the current motion state data representing motion features of the wheel-legged robot;
determining code configured to cause at least one of the at least one processor to input the current motion state data into a nonlinear controller to obtain a target joint angular acceleration reference value of a target robot joint of the wheel-legged robot; and
output code configured to cause at least one of the at least one processor to input the target joint angular acceleration reference value into a whole-body dynamics controller to output a joint torque for controlling the wheel-legged robot to perform a control task.

20. A non-transitory computer-readable storage medium, storing computer code that, when executed by at least one processor, causes the at least one processor to at least
obtain current motion state data of a wheel-legged robot, the current motion state data representing motion features of the wheel-legged robot;
input the current motion state data into a nonlinear controller to obtain a target joint angular acceleration reference value of a target robot joint of the wheel-legged robot; and
input the target joint angular acceleration reference value into a whole-body dynamics controller to output a joint torque for controlling the wheel-legged robot to perform a control task.

* * * * *